United States Patent
Brauch et al.

(10) Patent No.: US 6,741,225 B1
(45) Date of Patent: May 25, 2004

(54) DEVICE FOR GENERATING AN IMAGE

(75) Inventors: Uwe Brauch, Stuttgart (DE); Hans Opower, Krailling (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 69 days.

(21) Appl. No.: 09/693,590

(22) Filed: Oct. 20, 2000

Related U.S. Application Data

(63) Continuation of application No. PCT/EP99/02672, filed on Apr. 21, 1999.

(30) Foreign Application Priority Data

Apr. 22, 1998 (DE) .......................................... 198 18 007

(51) Int. Cl.⁷ ............................................... H04N 13/04
(52) U.S. Cl. ..................... 345/55; 345/103; 345/903; 345/32; 345/85; 345/86; 345/108; 345/109; 345/110; 345/111; 340/815.4; 340/815.42; 340/815.5; 340/815.52; 340/815.54; 340/815.73; 340/815.75; 340/815.76
(58) Field of Search .......................... 345/55, 103, 903, 345/32, 85, 86, 108, 109, 110, 111; 340/815.4, 815.42, 815.5, 815.53, 815.54, 815.73, 815.75, 815.76

(56) References Cited

U.S. PATENT DOCUMENTS

| | | | | |
|---|---|---|---|---|
| 4,839,635 A | * | 6/1989 | Harris et al. .................. | 345/55 |
| 5,862,278 A | * | 1/1999 | Brauch et al. ................. | 385/34 |
| 5,874,929 A | * | 2/1999 | Opower et al. ................ | 345/32 |

FOREIGN PATENT DOCUMENTS

| | | |
|---|---|---|
| DE | 34 04 412 | 8/1985 |
| EP | 0 068 288 | 1/1983 |
| EP | 0 455 449 | 11/1991 |
| EP | 0 758 778 | 2/1997 |
| GB | 2 148 570 | 5/1985 |
| JP | 7-63919 | 3/1995 |
| WO | WO 90/12384 | 10/1990 |

OTHER PUBLICATIONS

"Laser–TV", RFE 1995, No. 9, pp. 40–41.
Reuber, Claus, "Schlüsselbauelemente in Mikrosystemtechnik", Elektronik 1995, No. 18 pp. 36, 38.

* cited by examiner

*Primary Examiner*—Richard Hjerpe
*Assistant Examiner*—Jean Lesperance
(74) *Attorney, Agent, or Firm*—Barry R. Lipsitz; Douglas M. McAllister

(57) ABSTRACT

In order to provide a device for generating an image on an image surface with N×M image elements which can be illuminated individually, comprising a plurality of semiconductor radiation sources, each of which generates radiation with at least one color, an optical imaging means with a beam guidance, by means of which a plurality of image elements can be illuminated with each of the semiconductor radiation sources, with which it is possible to generate an image on an image surface in as simple a manner as possible using radiation sources, it is suggested that the image surface (12) be divided into a plurality of continuous image surface sections (14), each comprising a two-dimensional ensemble of image elements (16), that an illumination unit (20, 220, 320) be associated with each of the image surface sections (14) and that each illumination unit (20, 220, 320) have at least one semiconductor radiation source (30) and at least one optical imaging means (40, 240, 340) of its own associated with this illumination unit (20, 220, 230), this optical imaging means imaging a radiation outlet (31, 82, 224, 326) onto the corresponding image surface section (14) in a free beam propagation.

49 Claims, 16 Drawing Sheets

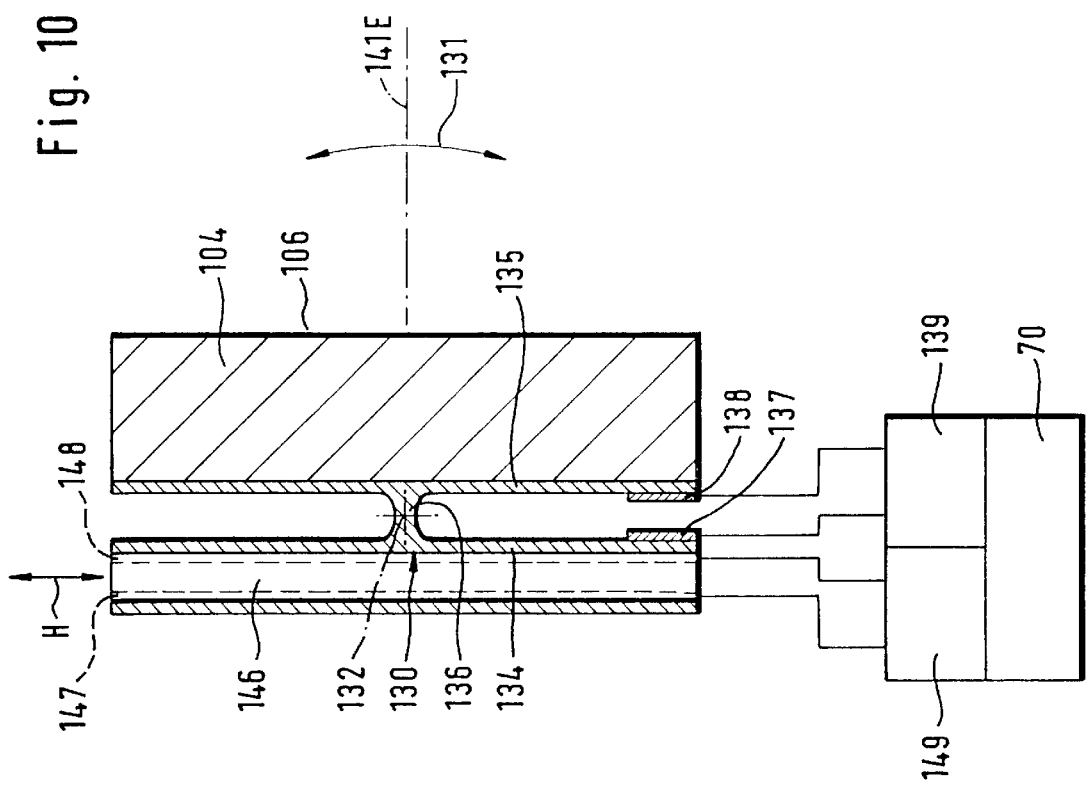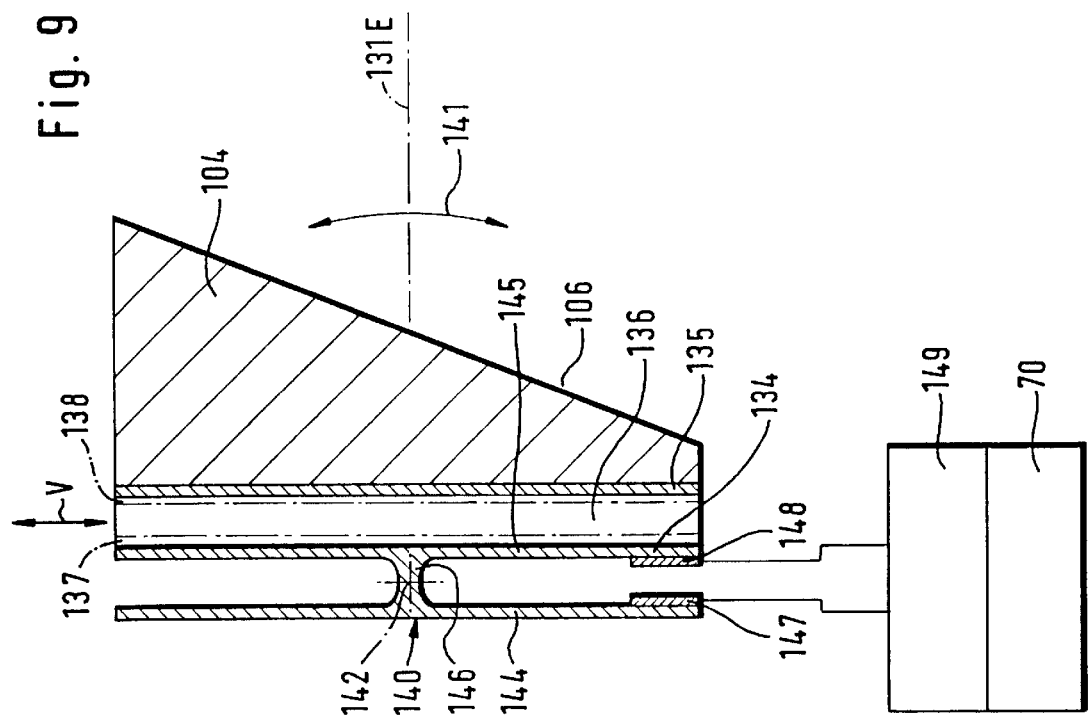

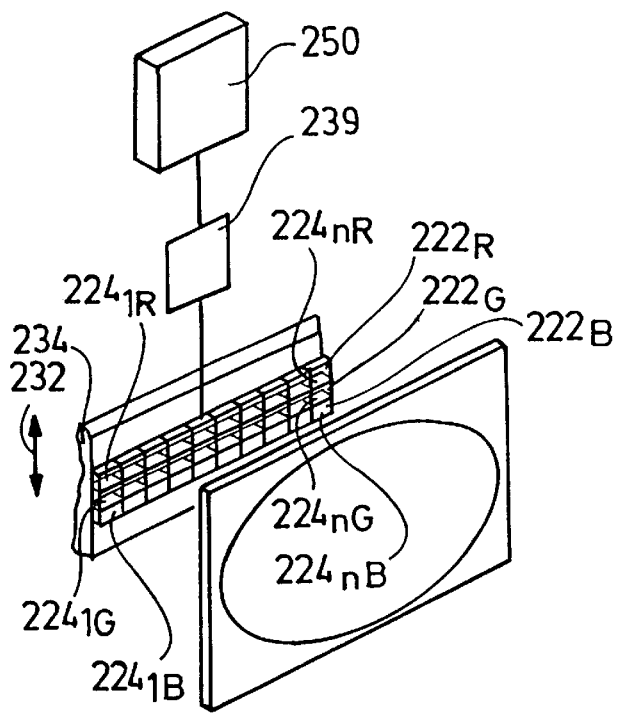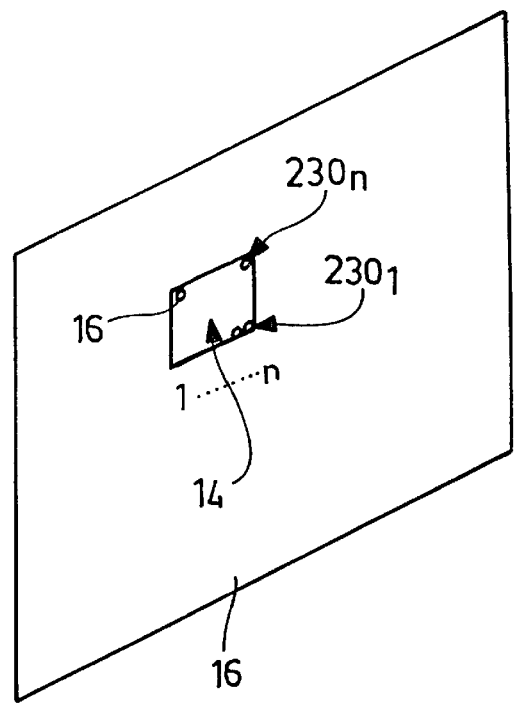
Fig. 16

DEVICE FOR GENERATING AN IMAGE

The present disclosure is a continuation of the subject matter disclosed in International Application No. PCT/EP99/02672 (WO 99/54861) of Apr. 21, 1999, the entire specification of which is incorporated herein by reference.

The invention relates to a device for generating an image on an image surface with N×M image elements which can be illuminated individually, comprising a plurality of semiconductor radiation sources, each of which generates radiation with at least one color, an optical imaging means with a beam guidance, by means of which a plurality of image elements can be illuminated with each of the semiconductor radiation sources.

The devices known so far for generating an image with laser radiation sources operate on the basis of projection devices, i.e. a large distance is provided between the optical imaging means and the image surface and the plurality of radiation sources serves to illuminate an integral fraction of the N image elements of one row or M image elements of one column or the entire N image elements of one row or the entire M image elements of one column at one point of time and to transfer to the next plurality of image elements at the next point of time. The optical imaging means is preferably arranged such that it comprises the radiation of all the radiation sources and images this onto the image surface as a unit and from time to time switches the illumination of a first plurality of image elements further onto the next plurality of image elements.

Proceeding from these known solutions, the object underlying the invention is to create a device for generating an image, with which it is possible to generate an image on an image surface in as simple a manner as possible using radiation sources.

This object is accomplished in accordance with the invention, in a device for generating an image of the type specified at the outset, in that the image surface is divided into a plurality of continuous image surface sections, each comprising a two-dimensional ensemble of image elements, that an illumination unit is associated with each of the image surface sections and that each illumination unit has at least one semiconductor radiation source and an optical imaging means of its own which is associated with this illumination unit and images a radiation outlet onto the corresponding image surface section in a free beam propagation.

The advantage of the inventive solution is to be seen in the fact that the individual illumination units can be arranged and assembled in a simple manner at the required distance from the image surface since, on account of the free beam propagation between the illumination units and the corresponding image surface sections of the image surface, no beam-guiding elements whatsoever, such as, for example, light guides, are required between the illumination units and the image surface in order to guide the radiation to the individual image elements since this is accomplished by the optical imaging means associated with the illumination unit with a free beam propagation.

The advantage of the inventive solution is also to be seen in the fact that with it it is possible to design the beam guidance more simply since the radiation of an illumination unit is used merely to illuminate one of the image surface sections and thus the beam can be guided in a simple manner.

In particular, a beam guidance in the form of a beam deflection is simple to realize since the beam has to be moved only over the dimensions of an image surface section and does not, as in the state of the art, have to be moved over the entire extension of the image surface at least in one direction.

When the dimension of the image elements and the image surface remains the same and a maximum deflection angle can be realized with simple means, this solution allows the distance between image surface and optical imaging means to be configured to be so small that the entire device can be designed as a flat screen.

As a result of the inventive idea of creating individual illumination units with at least one radiation source and an optical imaging means expressly associated therewith a concept is available which allows a plurality of identical illumination units corresponding to the number of image surface sections to be produced and these to be combined with one another in order to illuminate the total number of image surface sections.

Furthermore, it is also possible with this solution to design the optical imaging means in a more simple manner than the optical imaging means known from the state of the art, with which it was necessary to image a radiation field with an appreciably large cross section, consisting of the plurality of radiations, and to deflect this in at least one direction over large dimensions.

In order to be able to produce inventive devices in a particularly efficient manner it is preferably provided for the illumination units to be of an identical design. This possibility allows the illumination units for inventive devices to be produced in large quantities, wherein even illumination units produced with faults do not increase the production costs significantly since these can be eliminated by way of test procedures prior to the assembly of the illumination units to form inventive devices.

In this respect, it is particularly favorable when the illumination units are identically constructed and identically controllable modules so that the control of the illumination units can also be brought about particularly advantageously.

A particularly favorable arrangement of the illumination units provides for these to be arranged in a surface extending approximately parallel to the image surface. Such an arrangement of the illumination units allows the positioning of the illumination units relative to one another to be automated during the assembly of an inventive device.

This arranging of the illumination units may be realized particularly advantageously when the illumination units are arranged on a support, with which an exact positioning of the illumination units relative to one another is possible.

The exact positioning of the illumination units may be realized particularly expediently when these are provided with identical holding members and are held by them in corresponding receiving means on the support.

With respect to the type and arrangement of the image surface sections, no further details have so far been given.

In principle, the image surface sections could have different sizes.

It is, however, particularly favorable when the image surface is constructed from groups of image surface sections of the same size, i.e. the entirety of the image surface sections has several groups of image surface sections and within each of the groups of image surface sections these have the same size.

However, it is not a precondition that the image surface sections within one group are located immediately next to one another but rather it is likewise conceivable to arrange the image surface sections from different groups so as to be interconnected to one another.

The provision of groups of the same image surface sections likewise allows for a simplification during the production of the illumination units since identical illumination units can be made available for each group of image surface sections.

It is, however, even more advantageous when all the image surface sections have an identical size so that identical illumination units can be used for the image surface.

With respect to the shape and size of the image surface sections, further details have likewise not been given so far. One advantageous embodiment, for example, provides for the image surface sections to have maximum extensions which are in the same order of magnitude in the two directions defining the image surface and extending transversely to one another. This means that the image surface sections are not intended to have any line-like shape but at the most a rectangular shape.

It is, however, particularly advantageous when the image surface sections have maximum extensions which are approximately of the same size in the two directions defining the image surface. This means that the image surface sections have a shape approximating a regular polygon or a square.

One particularly advantageous solution provides for the image surface sections to have approximately the shape of a square or of a hexagon.

The advantage of such shapes of the image surface sections is to be seen in the fact that proceeding from a center point of the image surface sections the maximum beam deflection in the two directions defining the image surface is approximately of the same size and thus the optical imaging means can be configured in a particularly simple manner and also the beam deflection can be selected to be correspondingly simple.

With respect to the arrangement of the image elements belonging to each image surface section it would, for example, be conceivable to overlap the image surface sections insofar as next but one image elements of the image surface belong to one respective image surface section whereas the image elements located therebetween belong to another image surface section.

This would, in particular, be possible, for example, for the overlapping at the edge of consecutive image surface sections.

The inventive solution may, however, be designed in a particularly simple manner when all the image elements of one image surface section are located immediately next to one another, i.e. each of the image surface sections is always formed by the ensemble of image elements which are located immediately next to one another and which is then adjoined directly by the ensemble belonging to the next image surface section but without the image surface sections thereby overlapping.

With respect to the realization of the beam deflection, no further details have been given in conjunction with the embodiments described thus far. It would, for example, be conceivable to bring about a beam deflection by the beam deflection taking place for all the illumination units by means of one single beam deflecting device. This means that, for example, one beam deflecting element acts on all the illumination units or is effective for all the illumination units, wherein a relative movement between semiconductor radiation source and/or at least one part of the optical imaging means as well as the image surface section is generated for all the illumination units at the same time.

Since, in the present case, a plurality of illumination units is used which are directly associated with one image surface section, such a beam deflecting device effective for all the illumination units would have to be realized in a manner adapted precisely to the illumination units from a mechanical and optical point of view.

One particularly advantageous embodiment therefore provides for each illumination unit to have its own beam deflecting device associated with it, i.e. for each illumination unit to have not only a semiconductor radiation source and an optical imaging means but also a beam deflecting device associated with it so that illumination units of this type can be produced as standardized units which are simple to construct mechanically and optically and which can be combined with one another to illuminate the plurality of image surface sections.

Such a beam deflecting device is preferably designed such that with it a relative movement of the radiation field exiting from each illumination unit in relation to the image elements of the image surface section can be generated.

For this purpose it is preferably provided for at least one optical component of the illumination unit, i.e. the semiconductor radiation source and/or the optical imaging means, to be movable relative to the image surface section.

One possibility for the movable arrangement of one of the optical components preferably consists in arranging the radiation outlet of the radiation field from the semiconductor radiation source so as to be movable relative to the image surface section.

Alternatively or in addition thereto, it is likewise possible to arrange at least one component of the optical imaging means so as to be movable relative to the image surface section.

No further details have so far been given concerning the design of the beam deflecting device itself. It would, for example, be conceivable to provide a conventional drive for the beam deflecting device. It is, however, particularly favorable when the beam deflecting device comprises at least one micromechanical drive.

In order to be able to predetermine the beam deflection in two directions defining an area it is preferably provided for the beam deflecting device to comprise two drives operative in directions extending transversely to one another.

The drives for generating the beam deflection may be designed in the most varied of ways.

One advantageous embodiment provides for the drive to be designed as a displacement drive.

The displacement drive is preferably designed such that it has a guide arm which extends transversely to the direction of displacement, at one end supports the optical component of the illumination unit to be displaced and at the other end is securely arranged.

The guide arm preferably has a length which amounts to a multiple of the displacement path to be passed through so that the movement of the optical component in the direction of displacement takes place approximately linearly.

Furthermore, it is preferably provided for the guide arm to be deflectable by means of an electric field in the case of the displacement drive.

The guide arm preferably defines an initial position, proceeding from which the arm can be deflected by means of an electric field.

In order to bring about a controllable movement of the optical component in the direction of displacement the arm is preferably designed as a spring-elastic element which defines an initial position and which counteracts an increasing deflection out of the initial position with an increasing restoring force so that the deflection proceeding from the initial position can also be adjusted by specifying the strength of the electric field.

Alternatively to providing a displacement drive it is preferably provided for the drive to be designed as a tilting drive, i.e. a tilting of the optical component, preferably a component of the optical imaging means, can be brought about about an axis of tilt by means of the drive.

Such a tilting drive is preferably designed such that it has two support elements tiltable relative to one another about an axis of tilt, wherein one of the support elements is arranged on a base and the other one of the support elements supports the component to be tilted.

The two support elements are preferably connected by an elastically deformable material web which defines the axis of tilt between the two support elements on account of its deformability.

In order to bring about a tilting of the two support elements relative to one another these can preferably be acted upon with a force by means of an electric field acting on them.

In the simplest case, the force can thereby be applied by a capacitor arrangement.

The elastically deformable web between the two support elements preferably functions such that it defines an initial position and proceeding from the initial position counteracts a tilting movement with a restoring force which becomes stronger with increasing tilting, this restoring force then having to be compensated by a force to be applied by the electric field in order to bring about a tilting movement through a defined angle of tilt.

With respect to the operation of the drives, in particular, the micromechanical drives the most varied of solution possibilities are conceivable. One advantageous solution provides for one of the micromechanical drives to be designed as a static, adjustable drive, i.e. as a drive, with which displacements through defined distances or tilting movements about defined angles can be realized, wherein the respective position can preferably be maintained by the drive over a certain period of time.

Another advantageous solution, at least for the movement in one direction, provides for the micromechnical drive to be designed as an oscillating drive, i.e. this drive is not operated such that it adheres to static conditions, i.e. displacements or tilting movements, but rather it oscillates constantly back and forth with a predeterminable frequency and a predeterminable amplitude. This solution has the advantage that with it a rapid movement in the respective direction with adequate precision can be generated in a simple manner.

In this respect, it is particularly favorable when the oscillating drive operates close to its resonance frequency since, in this case, it is possible to operate the oscillating drive with less power.

Alternatively or in addition to the aforesaid embodiments, one particularly favorable solution provides for each illumination unit to have a row of radiation outlets which the optical imaging means images at the same time onto a row of image elements of the image surface section.

Such an arrangement creates the possibility of increasing the number of image elements illuminated at the same time and thus of simplifying, for example, the devices for illuminating all the image elements of one image surface section.

It would be conceivable, for example, to design the number of radiation outlets to be equal to half the number of image elements of the row of image elements and, at the same time, to illuminate respective next but one image elements, wherein, in this case, only a displacement of the radiation field impinging on the image surface section by one image element would be necessary in the direction of the row. This would likewise create the possibility of providing in this direction a simple means for moving the radiation field from the one image element to the next image element and at the same time of realizing a movement transversely to the row over all the rows of the image surface section. In both cases, it would be conceivable to provide oscillating drives for this purpose.

A particularly favorable solution does, however, provide for the number of the radiation outlets of the row to correspond to the number of image elements in a direction of the corresponding image surface section parallel to the row and for the illumination of the image surface section to be brought about by means of a beam deflection in a direction transverse to the row.

This solution creates the possibility of realizing all the image elements of the image surface section by means of a beam deflection in only one direction, wherein the realization of the beam deflection can be realized in the most varied of ways, such as described, for example, in conjunction with the preceding embodiments.

In order to be able to arrange the respective illumination unit on a support in an expedient manner with this embodiment of the inventive device it is preferably provided for the extension of the row of radiation outlets in the direction of its longitudinal direction to be smaller than the extension of the corresponding row of image elements in this direction. As a result, each illumination unit can have a smaller extension in the direction of the row than the corresponding image surface section and thus it is possible to arrange all the illumination units in a space-saving manner on one support, the extension of which corresponds at the most to the extension of the image surface.

In order to be able to illuminate the individual image elements in color, it has proven to be particularly favorable when each illumination unit has three rows of radiation outlets.

In this respect, the illumination unit is preferably designed such that radiation of one of three colors superimposable to form white light exits from each of the rows of radiation outlets so that defined mixtures of color may be achieved by way of the controlled activation of the three rows.

In order to be able to preferably and expediently image the three rows onto the image surface section with an optical imaging means it is provided for each of the various rows of radiation outlets to be activatable separately with respect to time via a control. In this case, a mixing of the colors does not, on account of the inertia of the optical perception of the observer, result due to the temporal congruence of the occurrence of the three different colors at an image element but rather the illumination of an image element with three different colors takes place one after the other so quickly with respect to time that on account of the inertia of the eye of the observer a mixing of the colors results due to an "averaging" of the color perception.

In conjunction with the preceding explanations concerning the individual embodiments it would, in principle, have been possible to subject the light of a semiconductor radiation source in addition to modulations. However, it is particularly preferred in the case of the embodiments described thus far for at least one semiconductor radiation source to be associated with each radiation outlet and for the intensity modulation of this radiation outlet to be brought about by way of intensity modulation of the semiconductor radiation source.

Alternatively thereto, a further, advantageous inventive embodiment provides for the illumination unit to have at least one row of modulation elements which modulate radiation in transmission and the respective light outlet areas of which form the radiation outlets which the optical imaging means images together onto the image surface section.

The idea of this solution thus provides for additional modulation elements which allow the light of a semiconductor radiation source to be used at the same time for illuminating several image elements in that a selective modulation of the intensity for the respective image element is brought about via the modulation elements provided in addition, wherein several modulation elements arranged in rows are preferably provided and their radiation outlets are imaged at the same time onto the image surface section by the optical imaging means so that the illumination of several image elements is brought about at the same time.

In this respect, it is particularly favorable when the illumination unit has a two-dimensional matrix of modulation elements which form a two-dimensional matrix of radiation outlets, wherein these radiation outlets are all imaged at the same time onto the image surface section by the optical imaging means.

In principle, it is not necessary for this purpose for the number of radiation outlets to correspond to the number of image elements of the image surface section. It is always possible to illuminate a partial number of the image elements of an image surface section at the same time by way of additional beam deflection and, subsequently, the next partial number for such a time until all the image elements of the image surface section have been illuminated. It is, however, particularly favorable when the number of modulation elements of the matrix corresponds to the number of image elements of the corresponding image surface section so that all the image elements of an image surface section can be illuminated at the same time.

In conjunction with the embodiment described thus far no details have been given as to how the illumination of the radiation outlets of the modulation elements is intended to take place. A particularly favorable solution provides for the modulation elements to have entry areas which the at least one semiconductor radiation source illuminates. This means that, in this case, one semiconductor radiation source is used for the purpose of illuminating the light entry areas of all the modulation elements of one illumination unit. It is, however, also conceivable to divide the modulation elements into partial numbers and allocate one semiconductor radiation source to each partial number.

A solution which is particularly inexpensive from a functional point of view provides for the at least one semiconductor radiation source to illuminate the light entry areas of all the modulation elements of one illumination unit, wherein this type of design of the inventive device is preferably based on a one-color illumination of the image elements.

If a colored illumination of the image elements is provided, it is preferably provided for several semiconductor radiation sources each supplying different colors to be used for each illumination unit.

In general, it applies for all the embodiments described thus far that, in the case of a colored illumination of the image elements, the illumination unit has at least three semiconductor radiation sources for the illumination of each radiation outlet, these sources generating radiation in three colors which can be superimposed to form white light.

This solution provides, for example, for the radiation of the three semiconductor radiation sources to be mixed prior to the respective radiation outlet.

Alternatively thereto, it is provided for three radiation outlets to be associated with each image element, wherein radiation in one of three colors which can be superimposed to form white light exits from each of the radiation outlets. In principle, it is possible to mix the colors each time by way of a simultaneous illumination of an image element.

However, it is also possible for the three semiconductor radiation sources each generating different colors to be activatable at different points of time, wherein the activation must take place in such short periods of time following one another that the eye of an observer averages the three consecutive, different colors and thus obtains an impression of a mixture of colors.

Within the scope of the preceding explanations concerning the semiconductor radiation sources, no further details have been given as to how these semiconductor radiation sources are intended to be designed. One advantageous possibility provides for the semiconductor radiation sources to be designed as semiconductor diodes, wherein the semiconductor diodes may, for example, be designed as superradiating semiconductor diodes.

One particularly advantageous variation of a semiconductor diode provides for this to be designed as a resonant LED.

Another advantageous design of the semiconductor radiation source provides for the semiconductor radiation source to be designed as a laser radiation source.

With respect to the design of the laser radiation source, no further details have been given in conjunction with the preceding embodiments. It has merely been defined that the laser radiation source is intended to be designed such that it generates at least laser radiation with one color. This means that simple dark/light contrast images could be generated. A particularly advantageous solution, in particular, for example, for use in advanced display or television technology provides for the laser radiation source to generate laser radiation with several colors. It is particularly favorable, in particular, in order to be able to produce all colors when the laser radiation source generates laser radiation with three colors which can be superimposed to form white, preferably red, green and blue.

In this respect, it is conceivable to design the laser radiation source such that it comprises, for example, for each of the laser radiations a source, preferably a semiconductor laser, which are seated close to one another.

The laser radiation from each of the semiconductor lasers can be imaged onto the image surface section either by one optical imaging means or by the optical imaging means provided for each of the respective sources.

Another advantageous solution provides for each laser radiation source generating laser radiation with several colors to have several sources generating the laser radiation with the different colors and for the different colors to be coupled into a light guide which leads to the optical imaging means. As a result of the amalgamation of the different colors in one light guide a simple geometrical configuration can be produced, with which the three colors can be imaged onto the image surface section together with one optical imaging means.

In this respect, it is conceivable, depending on the type of sources and the activation of the individual image elements, to design the illumination unit such that it illuminates each image element at the same time with the colors provided for it at the respective point of time or that it illuminates the individual colors of the image element at short intervals one after the other so that an averaging over the colors takes place by a human eye looking at such an image.

An image element within the meaning of the present invention is not to be understood, in particular, in the case of generation of a multicolored image as a single geometrical point, at which the three colors are superimposed. An image element within the meaning of the invention has an endless extension and can be designed in the case of three colors such that the three colors are superimposed either completely or partially or that the three colors are located next to one another and the entirety of the areas illuminated by the three colors defines this one image element.

With respect to the design of the laser radiation sources no further details have so far been given. One advantageous realization possibility, for example, provides for the laser radiation sources to comprise semiconductor lasers as sources for the laser radiation.

Semiconductor lasers of this type may, for example, be edge emitters or vertical emitters.

It is also conceivable within the scope of the invention for the generation of short-wave laser radiation to use a semiconductor laser with frequency doubling.

Additional features and advantages of the invention are the subject matter of the following description as well as the drawings illustrating several embodiments. In the drawings:

FIG. 9 shows an enlarged illustration of the part in FIG. 8 comprising a deflection mirror with tilting device;

FIG. 10 shows an enlarged illustration of a plan view in the direction of arrow C in FIG. 8;

FIG. 16 shows an illustration similar to FIG. 13 of an eighth embodiment of an inventive device with multicolored illumination of the image elements;

Figure 1:
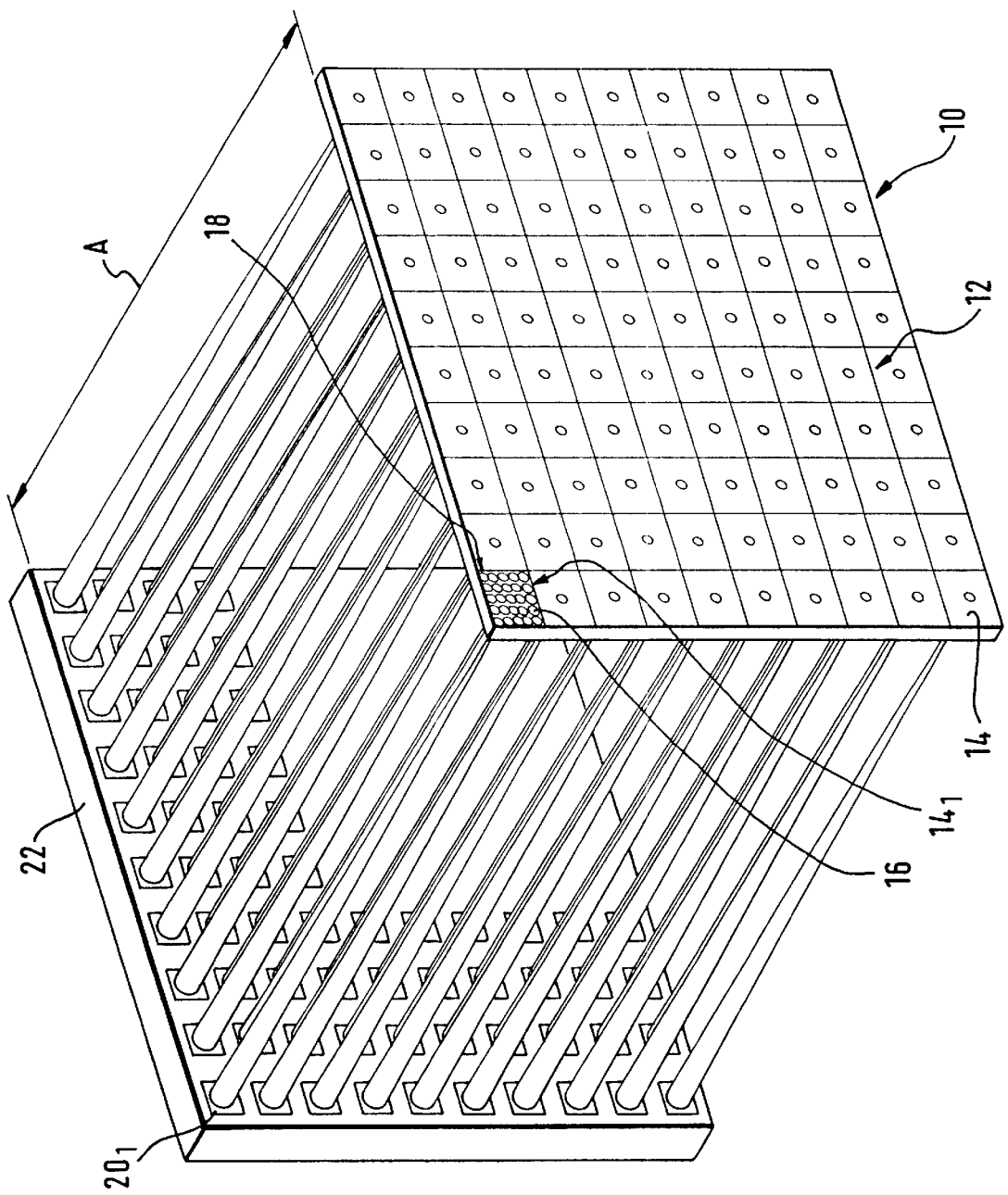
FIG. 1 shows a schematic illustration of the fundamental construction of an inventive solution with image surface and illumination units.

One embodiment of an inventive device for generating an image, illustrated as a whole in FIG. 1, provides for an image designated as a whole as 10 and having an image surface 12 to be generated such that the image surface 12 is composed of individual image surface sections 14, wherein it is illustrated with the example of the upper left-hand image surface section $14_1$ that this has, for example, a number of n×m, in particular, 5×5 individual image elements 16, wherein the number of 5×5 image elements 16 merely represents an exemplary value so that n is always substantially smaller than N and m substantially smaller than M but always greater than 1 so that each image surface section has a two-dimensional ensemble of image elements 16.

For example, each image surface section 14 preferably has a measurement of approximately 10×10 mm and, for example, a real image surface 12 comprises approximately 300×200 such image surface sections.

As is apparent, in addition, in FIG. 1, an illumination unit 20 is associated with each of the image surface sections 14, and all the illumination units 20 are supported, for example, by a base plate 22 which is arranged at a distance A behind the image surface which is, for example, in the order of magnitude of 5 cm.

Since each of the illumination units 20 is clearly associated with one image surface section 14, the illumination of the image elements 16 of each of the image surface sections 14 is brought about in that all the illumination units 20 illuminate the image surface sections 14 associated with them together during the same period of time, wherein the illumination of the individual image elements 16 of each image surface section 14 takes place, for example, successively one after the other.

Figure 2:
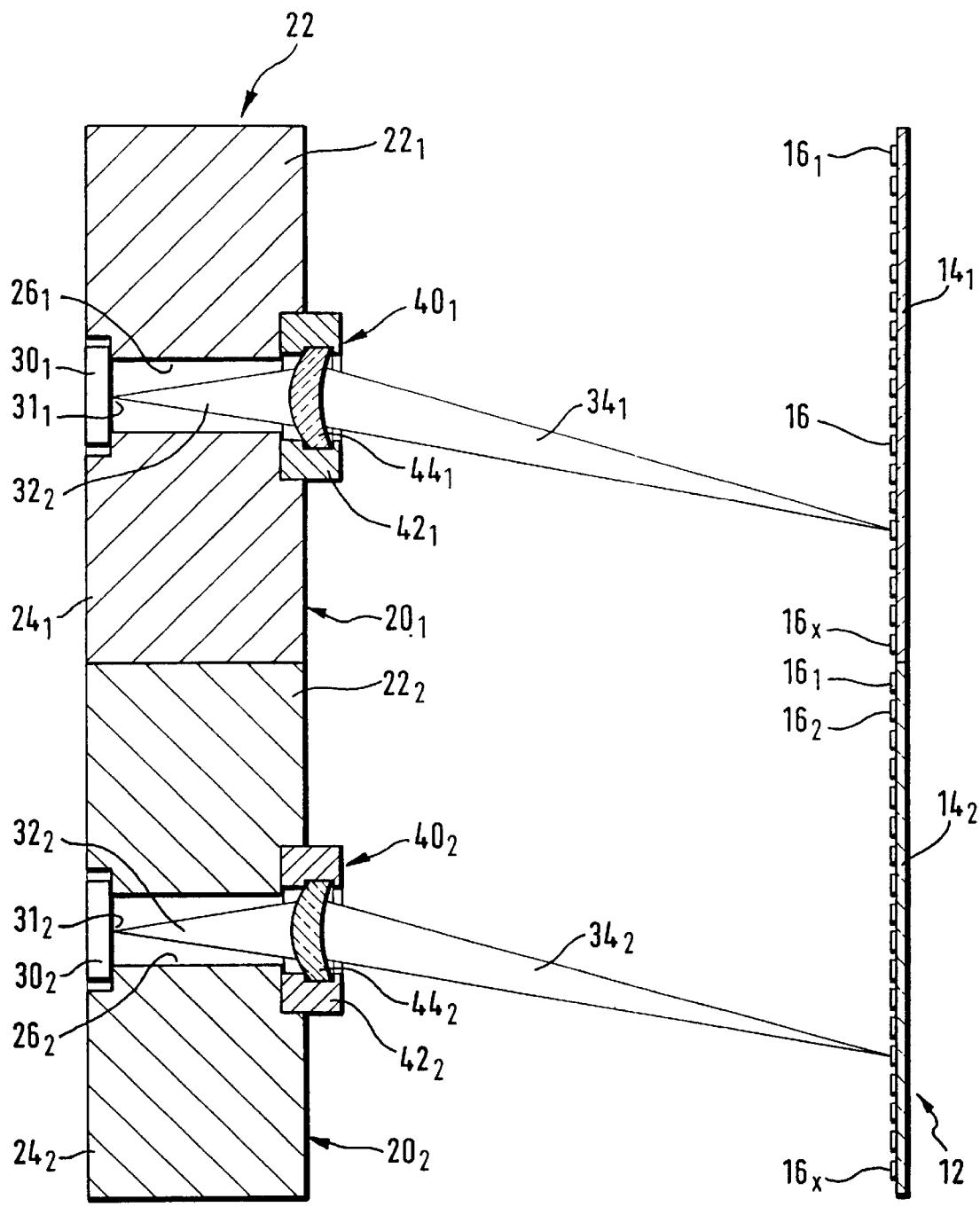
FIG. 2 shows a schematic illustration of a first embodiment of the inventive device.

In a first embodiment, this is explained in detail and by way of example in FIG. 2 on the basis of two illumination units $20_1$ and $20_2$ securely connected to one another.

The corresponding image surface section $14_1$ and $14_2$ is associated with each of these illumination units $20_1$ and $20_2$, each of these image surface sections having a number of n×m image elements 16 and, for example, X image elements $16_1$ to $16_x$ are provided in a vertical direction.

Each of the inventive illumination units comprises a laser radiation source 30 which is supported by the part $22_1$, $22_2$ of the base plate 22 associated with each illumination unit 20.

Proceeding from a radiation outlet $31_1$, $31_2$ of each of the laser radiation sources $30_1$, $30_2$, which are arranged, for example, in areas $24_1$ and $24_2$, respectively, of the respective parts $22_1$ and $22_2$ of the base plate 22 facing away from the image surface 12, a divergent radiation field $32_1$ and $32_2$, respectively, propagates through an opening $26_1$ and $26_2$, respectively, provided in the parts $22_1$ and $22_2$ and impinges each time on an optical imaging means $40_1$ and $40_2$, respectively, which is designated as a whole as 40, focuses the divergent laser radiation field $32_1$ and $32_2$, respectively, and images this onto the respective image surface sections $14_1$ and $14_2$ in a free beam propagation, i.e., for example, without any beam-forming elements such as light guides, as a focused radiation field $34_1$ and $34_2$, respectively, for illuminating the corresponding image elements 16.

Each respective optical imaging means $40_1$ or $40_2$ comprises a respective support $42_1$ or $42_2$ and a respective lens system $44_1$ or $44_2$ which is held by the respective support $42_1$ or $42_2$.

A deflection of the focused radiation field $34_1$ and $34_2$, respectively, for illuminating the different image elements 16 of the respective image surface sections $14_1$ or $14_2$ is brought about, for example, by a relative displacement of the laser radiation source 30 with the optical imaging means 40 relative to the image surface section 14 by means of a beam deflecting device, not illustrated in the drawings, in two directions extending transversely to one another. In this respect, either the laser radiation source 30 alone can be moved in two dimensions, for example, horizontally and vertically or the entire optical imaging means 40 alone in two dimensions or both together, as illustrated in FIG. 2.

Figure 3:
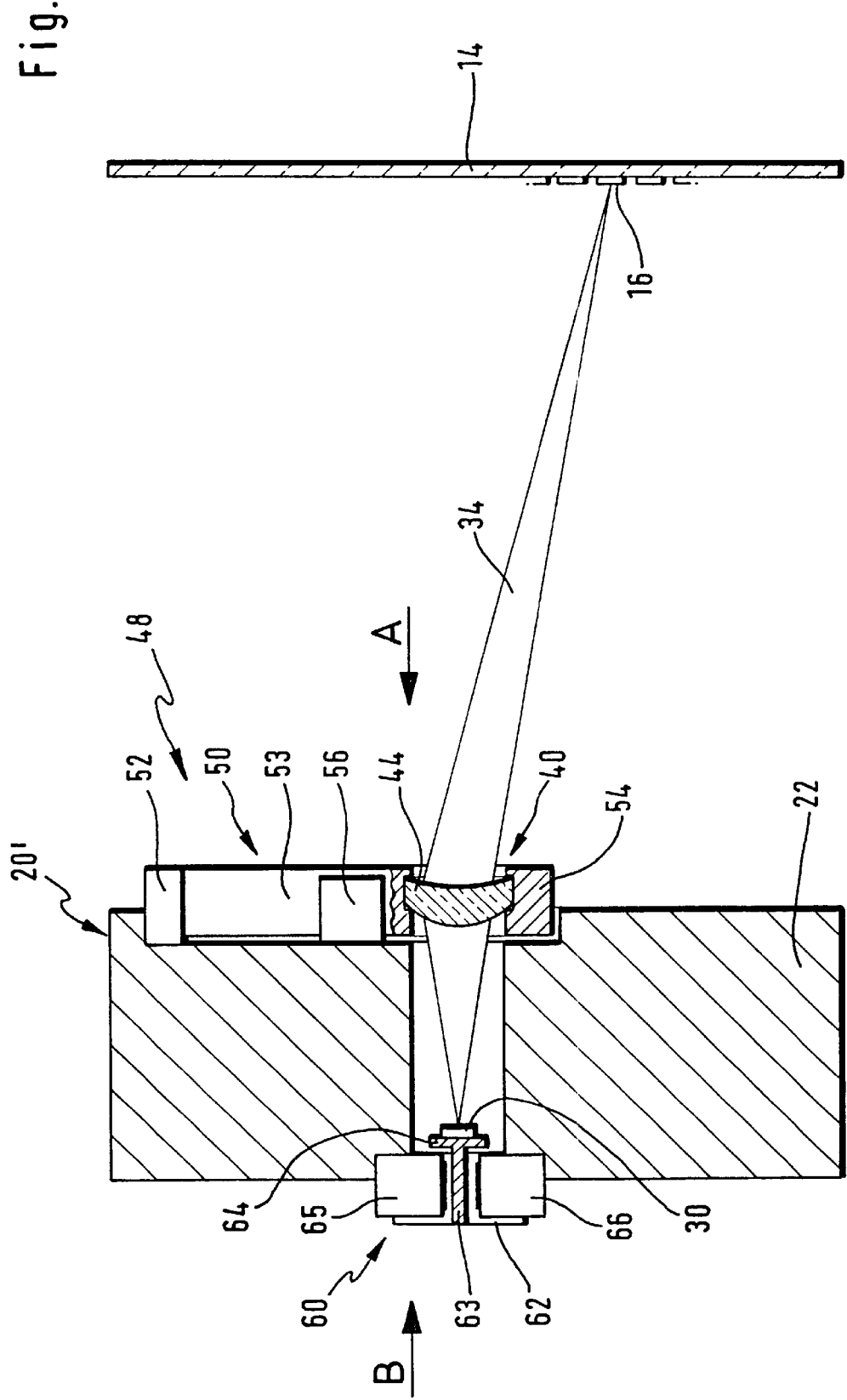
FIG. 3 shows a schematic illustration of a second embodiment of an inventive device in a general view.
Figure 4:
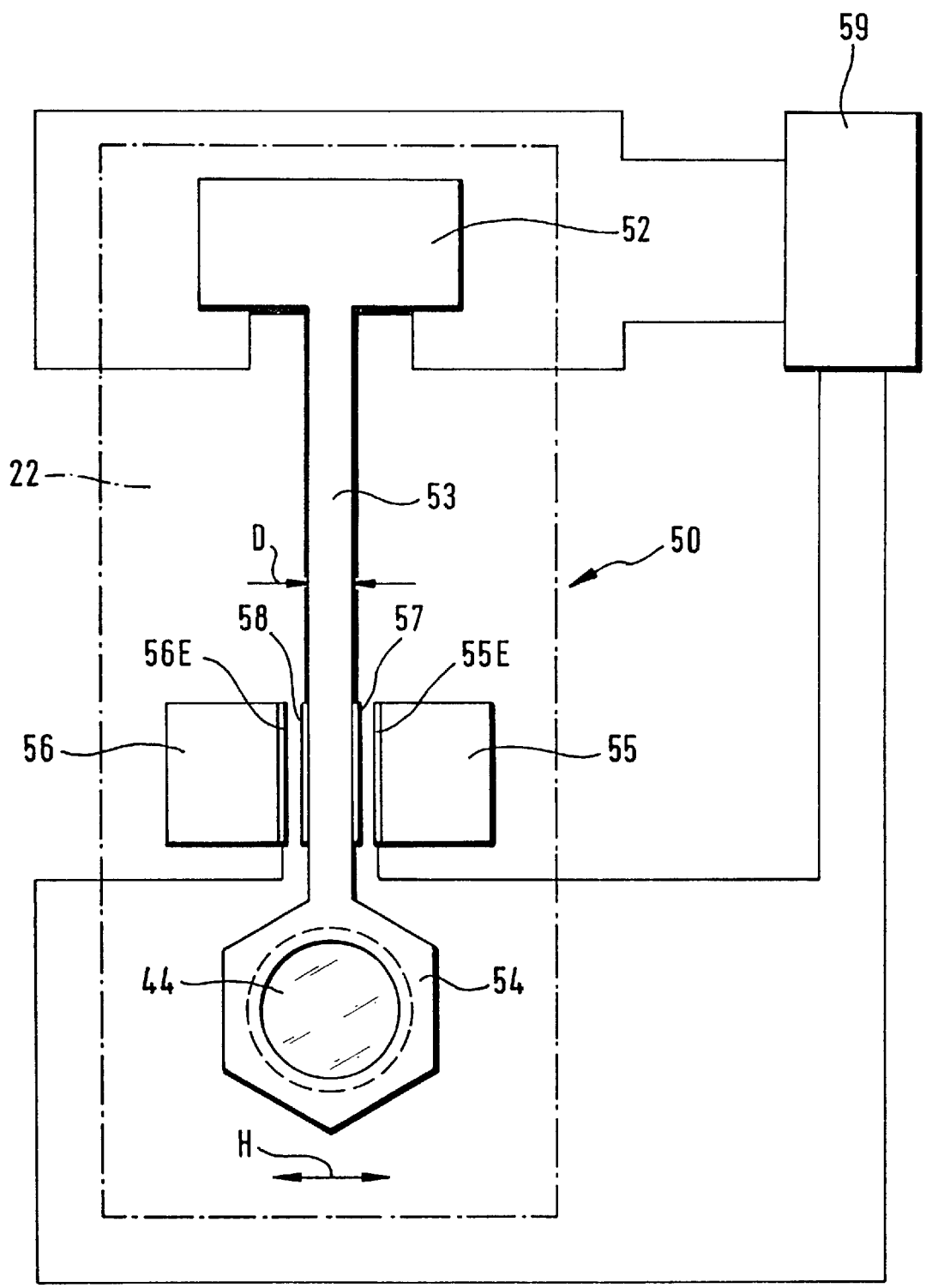
FIG. 4 shows a plan view in the direction of arrow A in FIG. 3.
Figure 5:
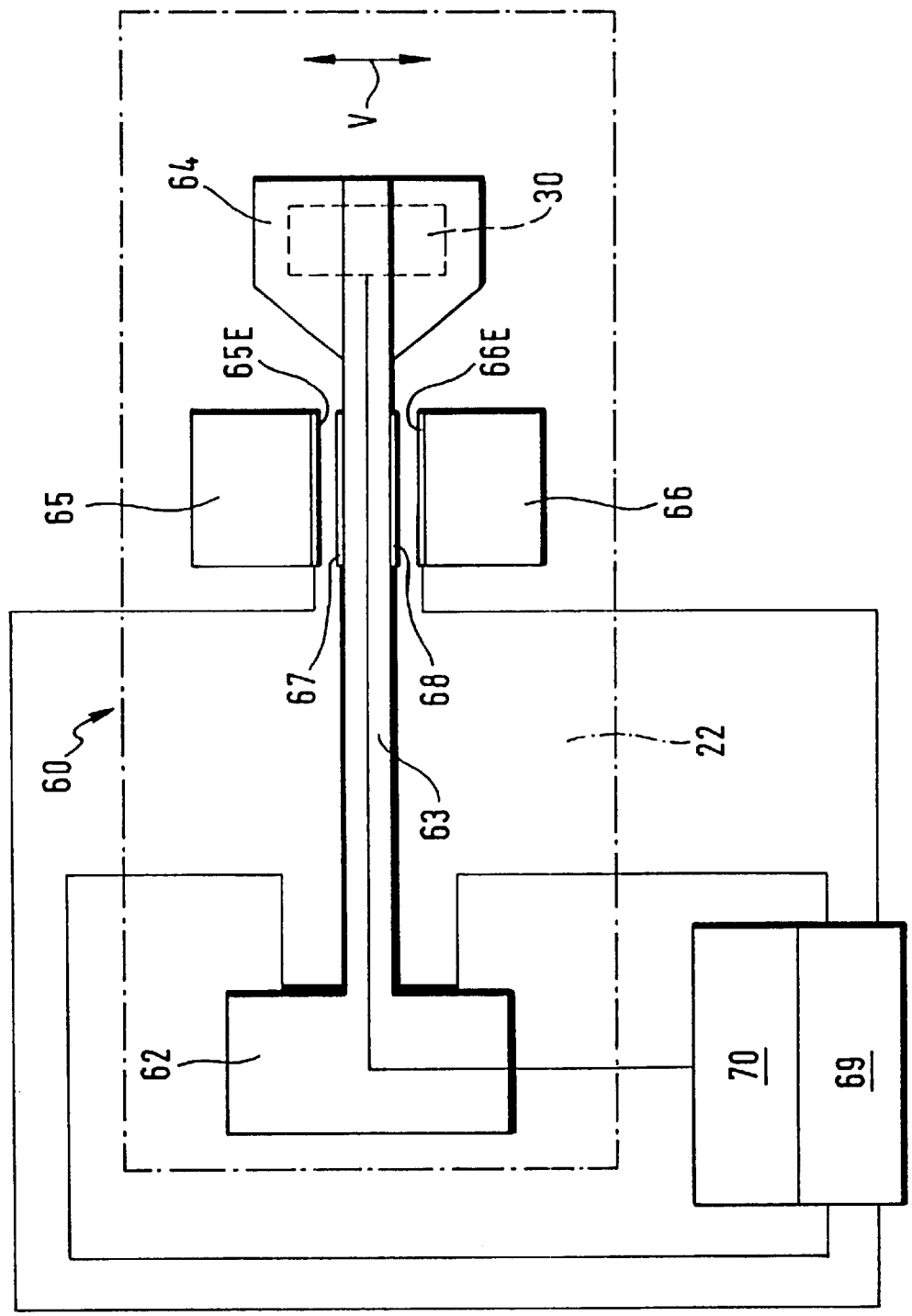
FIG. 5 shows a plan view in the direction of arrow B in FIG. 3.

An advantageous second embodiment, illustrated in FIGS. 3 to 5, comprises as beam deflecting device 48 two micromechanical beam deflecting systems 50 and 60 associated with the illumination unit 20', wherein the micromechanical beam deflecting system 50 serves to move the optical imaging means 40, for example, in a horizontal direction H whereas the micromechnical beam deflecting system 60 serves to move the laser radiation source 30 in a vertical direction V, as will be described in the following in detail.

The beam deflecting system 50 comprises a bearing block 52 which is securely held on the corresponding part of the base plate 22. Proceeding from this bearing block, an arm 53 extends in a direction transversely to the horizontal direction H as far as a support lug 54 which accommodates the optical imaging means 40, for example, the lens system 44.

The arm 53 and the support lug 54 do not rest on the part of the respective base plate 22 but are freely movable in relation to it. On account of the material elasticity of the arm 53 extending between the bearing block 52 and the support lug 54 the support lug 54 is thus movable in a horizontal direction H, approximately parallel to this, similar to a pendulum so that a movability of the lens system 44 is thus also given.

For this purpose, the arm 53 preferably has as slight a thickness D as possible in the horizontal direction H which helps to define the flexibility and elasticity of the arm 53.

On account of the movability of the support lug 54 as a result of the material elasticity of the arm 53, the arm 53 likewise gives rise to a restoring force in the direction of its initial position which is illustrated, for example, in FIG. 4 and so a force is necessary to deflect the support lug 54 in relation to the initial position.

For this purpose, deflection electrodes 55 and 56 are preferably provided close to the support lug 54 and on both sides of the arm, these electrodes having electrode surfaces 55E and 56E which face the arm 53 and interact with areal electrodes 57 and 58 which are provided on the arm and arranged on both sides thereof as well as face the electrode surfaces 55E, 56E.

Not only the electrodes 55 and 56 but also the electrodes 57 and 58 are connected to a deflection control which is designated as a whole as 59 and with which the deflection of the support lug 54 proceeding from the initial position can be controlled. For example, the control is possible due to the fact that varyingly high voltages are applied between the electrodes 55 and 57 or 56 and 58 which are associated with one another in respective pairs and give rise to an attraction of the arm 53 in the direction of the respective electrode 55 or 56 and thus deflect the arm 53 in the desired direction contrary to the restoring force occurring on account of the material elasticity, wherein it is customary for the restoring force to likewise increase with increasing deflection so that a slight deflection is possible by applying a low voltage and a stronger deflection by increasing the voltages between the pairs of electrodes 55 and 57 or 56 and 58.

In the case of the beam deflecting system 60 for the laser radiation source 30 a bearing block 62 is likewise provided, as illustrated in FIG. 5, and this is securely connected to the respective part of the base plate 22; an arm 63 extends from this bearing block, in this case transversely to the vertical direction V, and supports at its front end a support plate 64, on which the laser radiation source 30 is seated. Also in the case of the beam deflecting system 60 the arm and the support plate 64 are freely movable in relation to the base plate 22, and on account of its material elasticity the arm 63 is likewise deflectable in the vertical direction V not only downwards but also upwards proceeding from the initial position, namely contrary to a restoring force occurring on account of the material elasticity.

To deflect the arm, electrodes 65 and 66 are provided on both sides of the arm 63 near to the support plate 64 in the case of the beam deflecting system 60 in the same way as with the beam deflecting system 50, these electrodes facing the arm 63 with electrode surfaces 65E and 66E and the arm, for its part, bearing an electrode 67 facing the electrode 65 and an electrode 68 facing the electrode 66.

The electrodes 65 and 67 as well as 66 and 68 are also connected to a deflection control 69 which, in the same way as the deflection control 29 of the beam deflecting system 50 and by means of a respectively greater voltage, is in a position to deflect the arm 65 not only upwards but also downwards to a greater or lesser degree proceeding from the initial position and thus to move the laser radiation source 30 in a vertical direction.

By coordinating the deflection controls 59 and 69 of the beam deflecting device 48 with one another, it is thus possible to achieve a two-dimensional relative movement of the laser radiation source 30 and the lens system 44 in relation to the image surface section 14, namely in two dimensions so that the degree and direction of the deflection of the focused laser radiation field 34 may, as a result, be varied with respect to the individual image elements 16 of the image surface section 14 such that each of the image elements 16 of the image surface section 14 can be illuminated in a specific sequence.

The same control of the focused laser radiation field 34 is brought about for each of the illumination units 20' and so, as a result, each of the illumination units 20' is in a position to illuminate all the image elements 16 of the image surface section 14 associated with it within a time interval provided for the image build-up.

In the simplest case, all the deflection controls 59 and 69 of all the illumination units 20' are synchronized with one another so that all the illumination units 20' illuminate the image elements 16 of the respective image surface section 14 in the same sequence and with the same timing frequency, i.e. all the illumination units 20' illuminate a particular image element within the sequence in each of the image surface sections at a specific point in time.

If, however, any flickering is to be avoided, it is possible to keep the period of time for the image build-up constant, to operate the deflection controls 59 and 69 of the individual illumination units 20' such that the illumination of one image element 16 to the next image element 16 does change with the same timing frequency but the deflection controls 59 and 69 of each of the illumination units 20' start at different image elements 16 within the individual image surface sections 14 at the beginning of the interval so that all the image elements 16 of the respective image surface section are illuminated within the interval and with the same timing frequency but at the same time the respective image elements 16 of all the image surface sections 14 corresponding to one another are not illuminated simultaneously.

Alternatively thereto, it is, however, also conceivable to have the deflection controls 59 and 69 of each of the illumination units 20' operating completely unsynchronized relative to the other illumination units 20, the only condition being that all the image elements 16 of one image surface section 14 are illuminated within the respective interval provided for the image build-up. As a result, any "flickering" of the image 12 with the frequency of the illumination of the individual image elements 16 can be avoided.

In order to be able to illuminate the individual image elements 16 of each image surface section 14 with varying brightness, it is provided, in addition, for the deflection controls 59 and 69 to cooperate at the same time with a brightness control 70 which operates the laser radiation source 30 and in the simplest case, by altering the supply current to the laser radiation source 30, varies the intensity of the laser radiation field 32 exiting from this source in accordance with the desired brightness during the illumination of the individual image element 16.

Since image elements 16 of one image surface section 14 located next to one another are preferably illuminated with the inventive beam deflecting systems 50 and 60 such that an illumination of all the image elements 16 of one row 18 extending, for example, in a horizontal direction H takes place first of all and then an illumination of the image elements 16 in the row 18 located underneath in a vertical direction V, the speed, with which the beam deflection takes place in the horizontal direction H, is greater than the speed of the deflection in the vertical direction V. For this reason, the beam deflecting system 50 is constructed, for example, such that the deflection control 59 operates the deflection of the support lug 54 in the form of a periodic oscillation, i.e. the support lug 54 oscillates in the horizontal direction H with a specific frequency. If the energy expended by the deflection control 59 is intended to be kept as low as possible, the arm is designed such that the desired frequency is close to the resonance frequency of the arm 53 so that the "pendulum" formed by the support lug 54 with the lens system 44 and the arm 53 is oscillatingly operated in the region of its resonance frequency.

Figure 6:
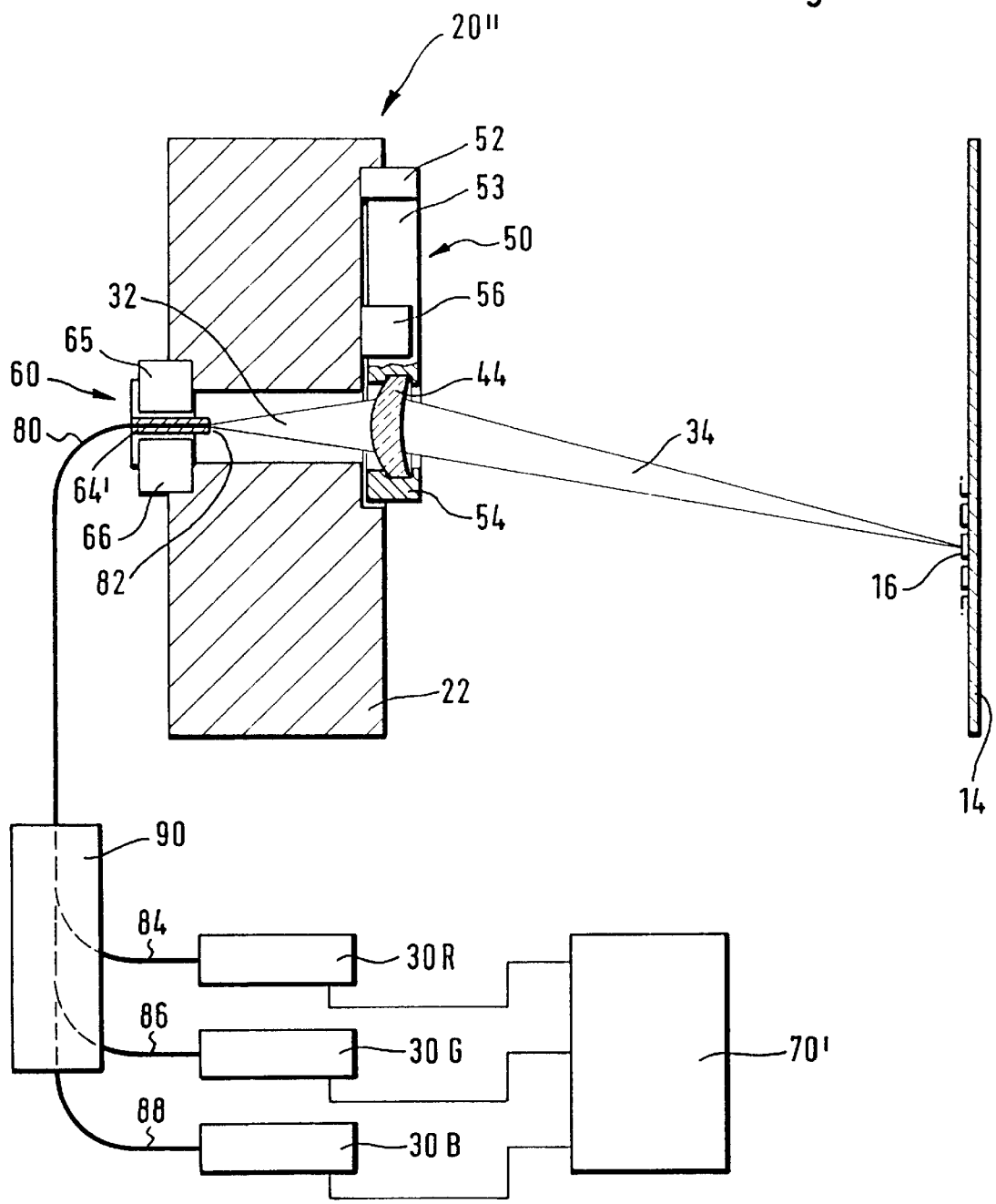
FIG. 6 shows a view similar to FIG. 3 of a third embodiment of an inventive device.

In a third embodiment of an inventive illumination unit 20″, illustrated in FIG. 6, those parts which are identical to those of the preceding embodiment are given the same reference numerals and so with respect to the description thereof reference can be made in full to the comments concerning the preceding embodiment.

In contrast to the first embodiment, the beam deflecting system 60 no longer has a support plate 64 but rather a receiving means 64' for a movable light guide 80 which is held in the receiving means 64' and has one end as a radiation outlet 82, from which the divergent radiation field 32 exits in the direction of the lens system 44.

The light guide 80 is designed such that it guides multicolored, i.e., red, green and blue light in varying, partially differing proportions which are generated by laser radiation sources 30R, 30G and 30B arranged, for example, stationarily on the base plate 22 or a separate, stationary support, are coupled into light guides 84, 86, 88 and lead to a coupling element which is designated as a whole as 90 and, for its part, couples the laser radiation into the light guide 80.

As a result, it is possible to generate not only white light but also light of any desired color in the known manner in the region of the respective image element 16 of the respective image surface section 14, wherein, for this purpose, the brightness control 70' controls the intensities of the laser light of all the laser radiation sources 30R, 30G and 30B at the same time.

Figure 7:
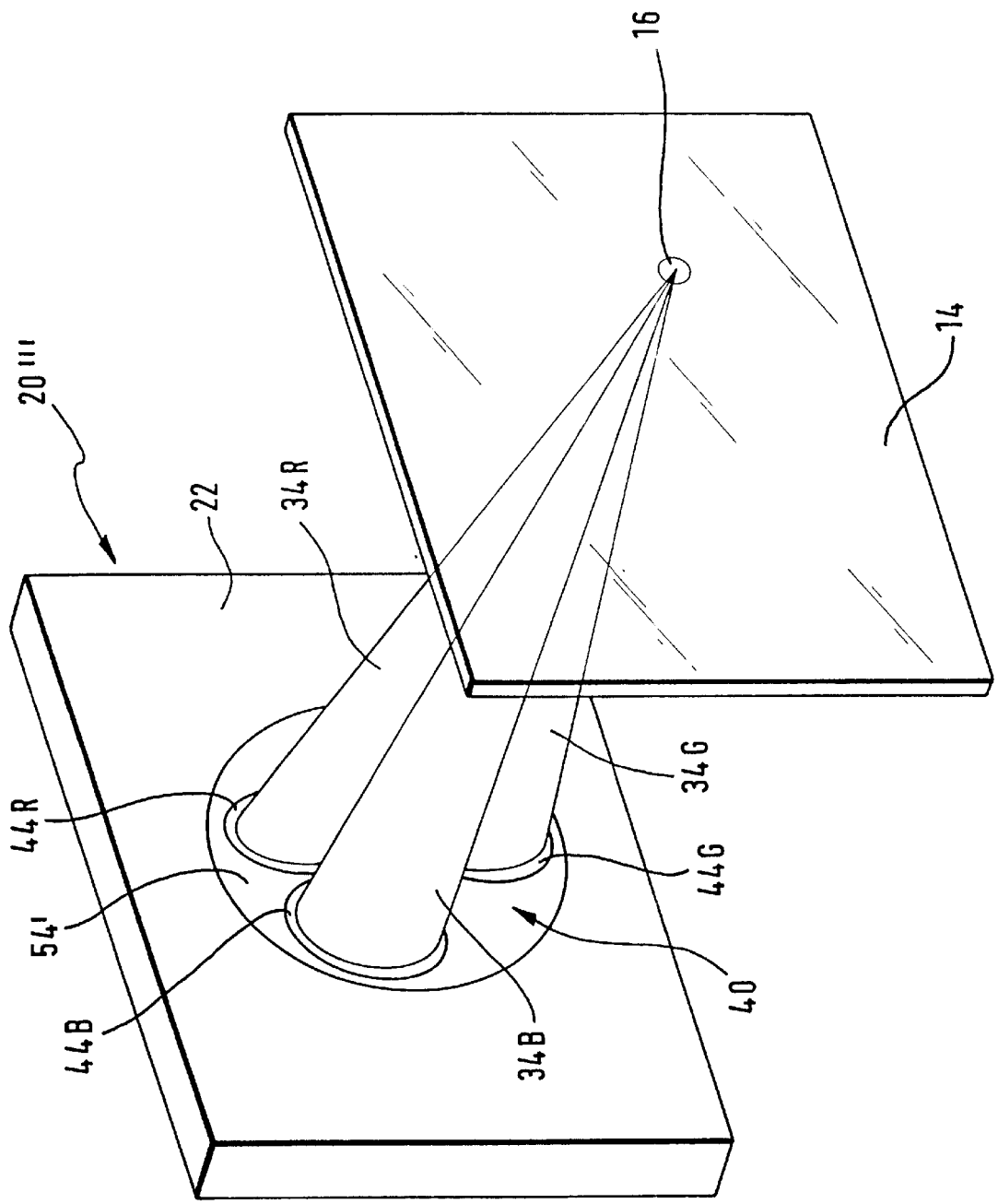
FIG. 7 shows a perspective view of a fourth embodiment of an inventive device.
Figure 8:
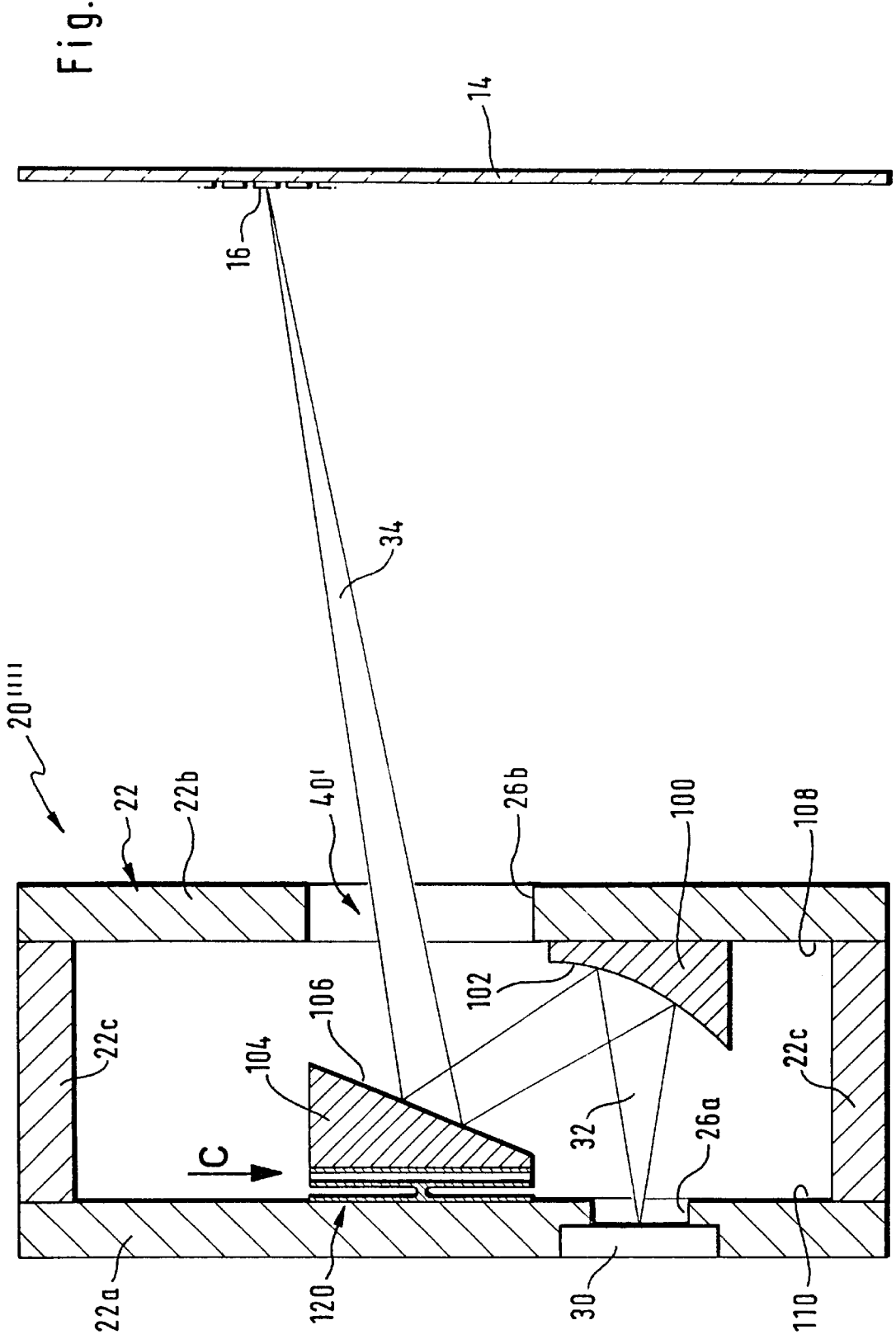
FIG. 8 shows a fifth embodiment of an inventive device.

In a fourth embodiment of an inventive illumination unit 20‴, illustrated in FIG. 7, the possibility of generating colored image elements 16 in the respective image surface section 14 is likewise provided. For this purpose, the illumination unit does, however, generate three focused laser radiation fields 34R, 34G and 34B which are each focused onto the corresponding image element 16 proceeding from the base plate 22. This means that a laser radiation source 30R, 30G and 30B not illustrated in the drawing is provided for each color, these radiation sources being arranged spatially next to one another and a lens system 44R, 44G and 44B being associated with each of them, the lens system focusing the divergent laser radiation from the respective laser radiation source onto the image element 16.

All the lens systems 44R, 44G and 44B are held in a common support lug 54' corresponding to the support lug 54 and can, for example, likewise be moved in accordance with the support lug 54' with a beam deflecting system 50, wherein in FIG. 7 the corresponding beam deflecting device, which operates exactly the same as the beam deflecting device 48 of the third embodiment, is not illustrated in detail.

Furthermore, all the laser radiation sources 30R, 30G and 30B are also arranged together on a support plate 64 and thus can likewise be moved together by a beam deflecting system in accordance with the beam deflecting system 50.

As a result, the image elements 16 of the image surface section can also be illuminated in color in the fourth embodiment illustrated in FIG. 7 in the same way as that described in conjunction with the second embodiment.

In a fifth embodiment of an inventive illumination unit 20″″, the base plate 22 is constructed from two plate sections 22a and 22b which are arranged at a distance from one another, for example, by means of spacer elements 22c (FIGS. 7 to 10).

In this respect, the plate section 22b is provided between the plate section 22a and the image surface section 14.

The plate section 22a supports a laser radiation source 30 which is securely arranged on it. For example, the plate section 22a has an opening 26a, through which the divergent laser radiation field 32 coming from the laser radiation source 30 passes. The divergent laser radiation field 32 impinges on a focusing mirror 100 with a concavely curved mirror surface 102 which reflects the divergent radiation field 32 as a focused radiation field, namely onto a deflection mirror 104 with a plane mirror surface 106. The focusing mirror 100 and the deflection mirror 104 form the optical imaging means 40'.

The focusing mirror 100 is thereby seated on a side 108 of the plate section 22b facing the plate section 22a and the deflection mirror 104 on a side 110 of the plate section 22a facing the plate section 22b. The focused laser radiation field 34 reflected by the deflection mirror 104 propagates in the direction of the image surface section 14 and thereby passes through an opening 26b in the plate section 22b and then impinges on the image element 16 to be illuminated on the image surface section 14.

In order to now bring about a deflection of the focused laser radiation field 34 such that all the image elements of the image surface section 14 can be illuminated in the manner described, a beam deflecting device 120 which has two beam deflecting systems 130 and 140 is provided between the deflection mirror 104 and the plate section 22a which supports it.

The beam deflecting system 130, illustrated in FIG. 10, serves to tilt the deflection mirror 104 about an axis 132 which extends in vertical direction V so that a pivoting movement of the deflection mirror 104 in accordance with arrow 131, which is located in a horizontal plane 131E, follows due to a tilting movement about the axis 132.

Furthermore, a tilting about a horizontal axis 142 is possible due to the beam deflecting system 140 (FIG. 9) and so the deflection mirror 104 performs a pivoting movement in accordance with arrow 141 which is located in a vertical plane 141E.

The beam deflecting system 130 comprises for this purpose two plate-like parts 134 and 135 which are arranged at a distance from one another and are connected to one another via a web 136, wherein the web 136 is designed such that the plate-like parts 134 and 135 extend parallel to one another. The web 136 is thereby produced from an elastically deformable material so that the plate-like parts 134 and 135 can perform a tilting movement relative to one another with deformation of the web 136, wherein the plate-like parts 134 and 135 can be moved either towards one another or away from one another. The axis of tilt 132 located in the region of the web 136 is thereby defined.

The plate-like parts 134 and 135 support, for example, at an end area facing away from the web electrodes 137 and 138 which are connected to the deflection control 139. If a voltage is applied to the electrodes 137 and 138 facing one another due to the deflection control 139, a tilting of the plate-like parts 134 and 135 in the direction towards one another is possible contrary to the restoring force of the elastically deformable web 136 and so the electrodes 137 and 138 come closer to one another and thus cause a tilting about the axis of tilt 132, wherein the magnitude of the tilting movement is dependent on the voltage applied at the electrodes 137 and 138 which likewise increases with an increasing tilting movement about the axis of tilt 132 on account of the increasing restoring force of the elastically deformable web 136.

The beam deflecting system 140 (FIG. 9) also comprises two plate-like parts 144 and 145 arranged parallel to one another, wherein the plate-like part 145 can coincide with the plate-like part 134 of the beam deflecting system 130.

These plate-like parts 144 and 145 are also connected to one another by a web 146 which extends in horizontal direction H and is likewise elastically deformable so that the axis of tilt 142 is also defined by the tilting movement of the plate-like parts 144 and 145 relative to one another.

These plate-like parts are also provided in an end area located opposite the web with electrodes 147 and 148 which face one another and can be controlled via a deflection control 149 so that as a result of applying a voltage by way of the deflection control 149 and thus of an attraction between the electrodes 147 and 148 to a varying degree a tilting about the axis of tilt 142 to a varying degree can be generated which counteracts the elastic restoring force of the web 146.

Furthermore, the fifth embodiment of the inventive illumination unit 20"" is also provided with a brightness control 70 for the laser radiation source 30 which interacts with the deflection controls 139 and 149 in order to determine the brightness for each of the illuminated image elements 16.

As for the rest, the deflection controls 139 and 149 can operate in the same way as the different variations described in conjunction with the deflection controls 59 and 69.

Figure 11:
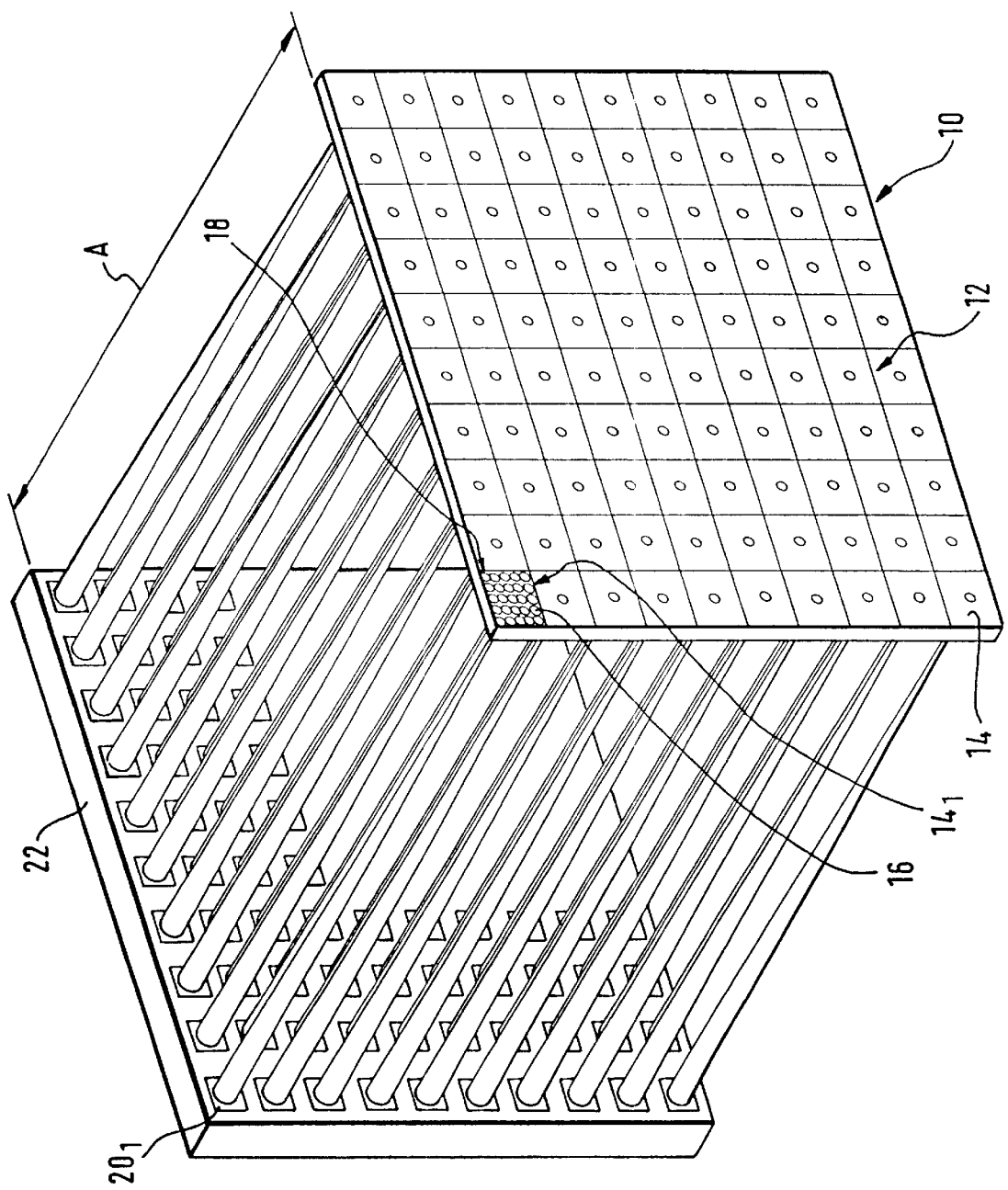
FIG. 11 shows a perspective view similar to FIG. 1 of a sixth embodiment of the inventive device.
Figure 12:
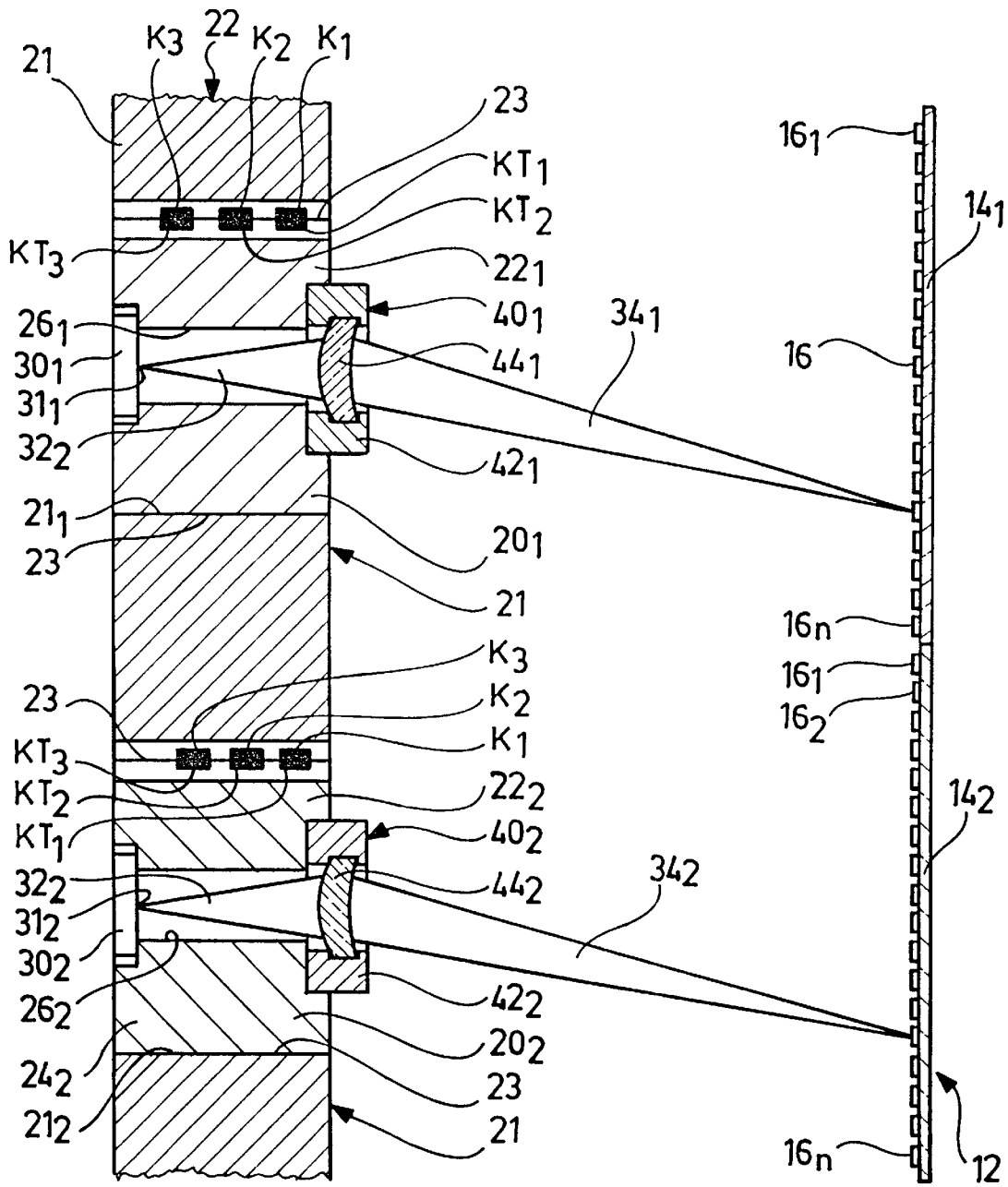
FIG. 12 shows a section along line 12—12 through the sixth embodiment, illustrated in FIG. 11.

In a sixth embodiment of the inventive solution, illustrated in FIGS. 11 and 12, those parts which are identical to those of the preceding embodiments, in particular, the first embodiment have been given the same reference numerals.

In the sixth embodiment, illustrated in FIGS. 11 and 12, the base plate 22 comprises a frame 21, into which the base plate parts $22_1$, $22_2$ can be inserted. In this respect, the frame 21 forms receiving means $21_1$, $21_2$, into which the base plate parts $22_1$ can be inserted as insertion members, wherein these abut with their outer sides 23 in the receiving means $21_1$, $21_2$.

Furthermore, contact elements $K_1$ to $K_3$ are preferably provided on the frame 21 and these can be brought into contact with contact elements $KT_1$ to $KT_3$ of the base plate parts $22_1$, $22_2$ in order to be able to realize a control of the individual illumination units $20_1$, $20_2$ in a simple manner via conductors guided in the frame 21.

As for the rest, the illumination units $20_1$, $20_2$ are constructed and designed in the same way as in the first embodiment or one of the additional embodiments and so reference is made in full to their description.

Figure 13:
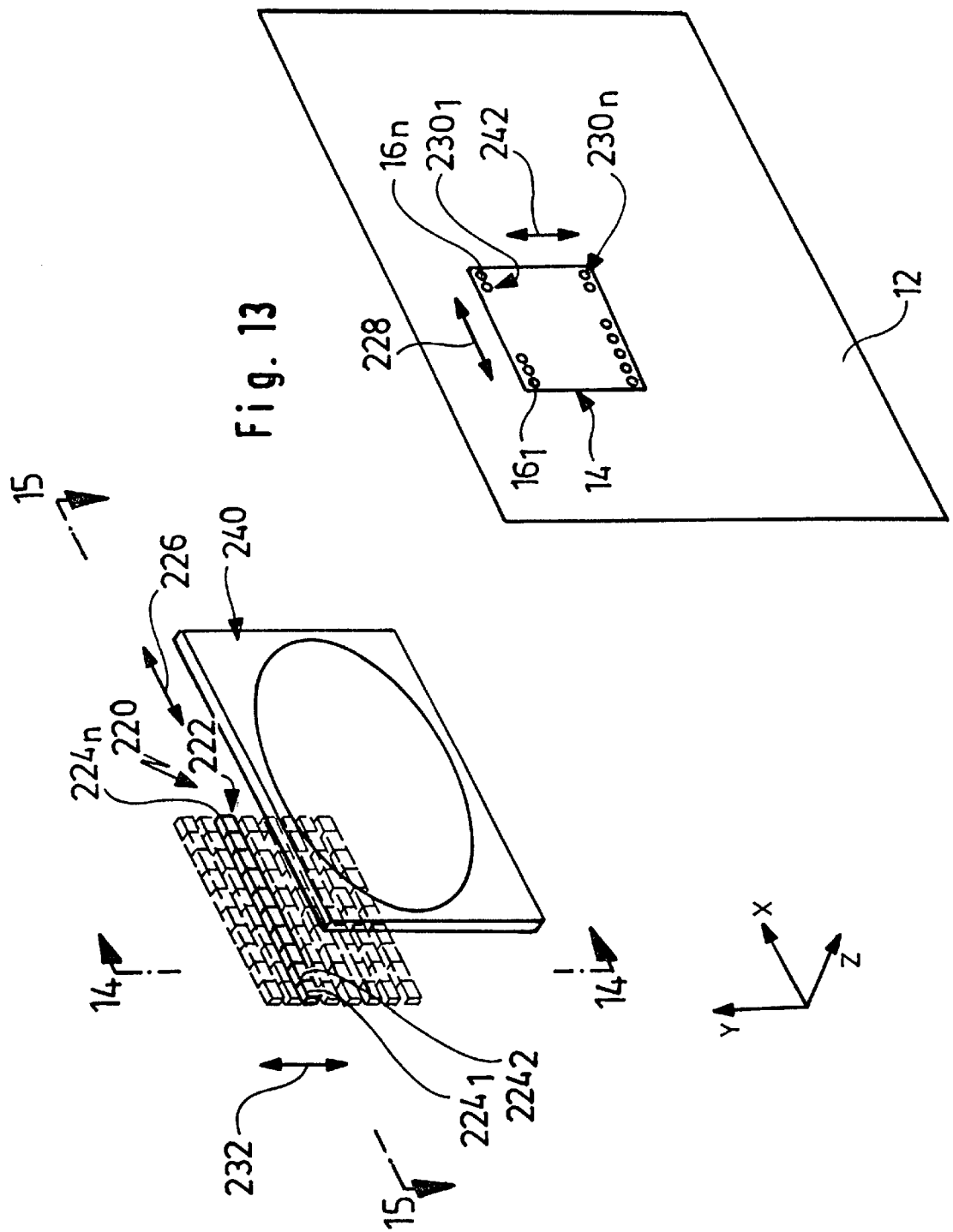
FIG. 13 shows a perspective, simplified illustration of a seventh embodiment of the inventive device with an illumination unit for illuminating an image surface section illustrated representatively.

In a seventh embodiment of the inventive solution, illustrated in FIG. 13, each illumination unit 220 comprises a row 222 of beam outlet openings $224_1$ to $224_n$, wherein the beam outlet openings $224_1$ to $224_n$ are arranged to follow one another along a direction 226 which coincides with a direction 228, in which the individual image elements $16_1$ to $16_n$ are arranged so as to follow one another.

The entire row 222 of beam outlet openings $224_1$ to $224_n$ is imaged onto a corresponding image element row 230 of image elements $16_1$ to $16_n$ by means of an optical imaging means 240, wherein this images each individual beam outlet opening $224_1$ onto a corresponding image element $16_1$ of the respective row 230 so that one of the radiation outlets $224_1$ to $224_n$ is exclusively associated with each individual image element $16_1$ to $16_n$.

The extension of the radiation outlets $224_1$ to $224_n$ is preferably smaller than that of the corresponding image elements $16_1$ to $16_n$ and, moreover, the radiation outlets $224_1$ to $224_n$ of the row 222 are arranged closer to one another so that altogether the row 222 has a smaller extension in the direction 226 than the respective row 230 of image elements $16_1$ to $16_n$. This allows individual illumination units 220 to be inserted into a frame 21 next to one another, as illustrated in FIGS. 14 and 15, in the same way as in the sixth embodiment.

Figure 15:
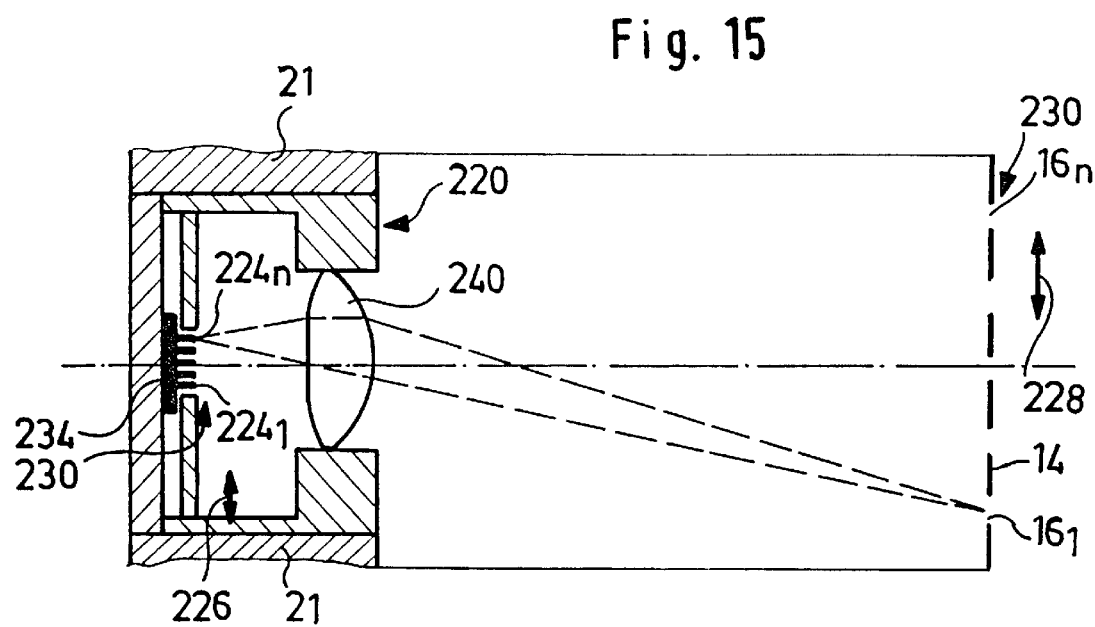
FIG. 15 shows a section along line 15—15 in FIG. 13.

Since, as illustrated in FIG. 15, the optical imaging means 240 images all the radiation outlets $224_1$ to $224_n$ at the same time onto the image surface section 14, all the image elements $16_1$ to $16_n$ of the row 230 of image elements can be generated in the direction 228 at the same time by the row 222 of radiation outlets $224_1$ to $224_n$.

Figure 14:
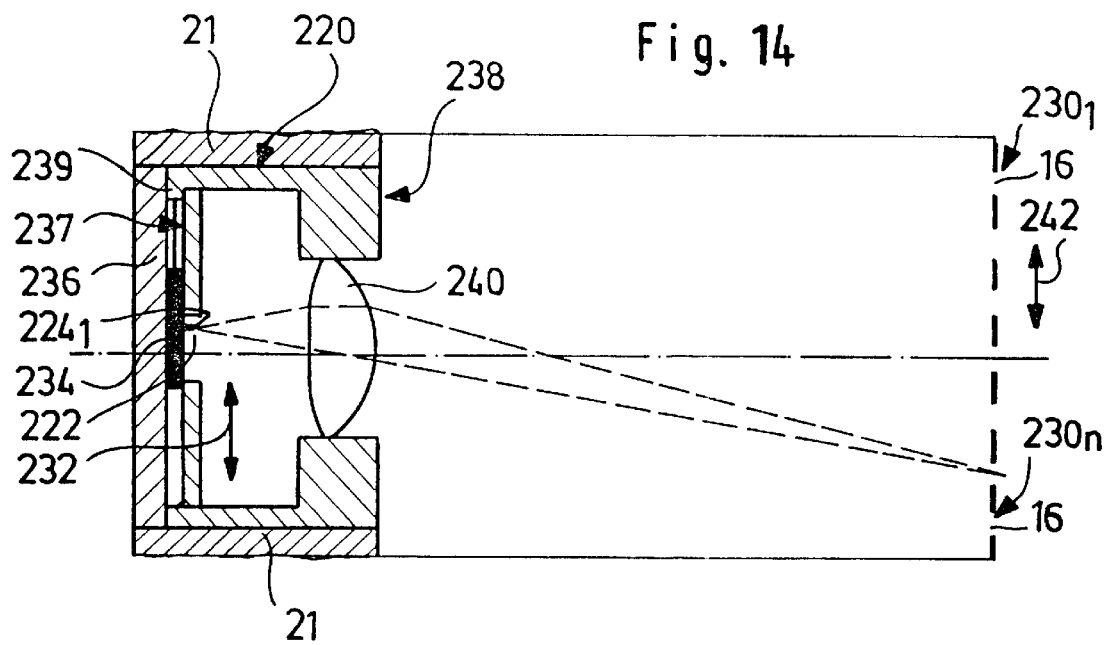
FIG. 14 shows a section along line 14—14 in FIG. 13.

In order to illuminate the plurality of image elements 16 present transversely to the direction 228, as well, the entire row 222 of radiation outlets, in this case the radiation outlet $124_1$ by way of example, is, as illustrated in FIG. 14 on the basis of the image elements $16_1$ to $16_n$, displaceable in a direction 232 transverse to the direction 226, wherein for this purpose the row of radiation outlets $224_1$ to $224_n$ is, for example, arranged on a support 234 which is guided in a guide means 237 of a housing 238 of the illumination unit 220 so as to be displaceable in relation to a base plate 236 and is driven by means of a drive 239, wherein the support 234, the guide means 237 and the drive 239 form a beam deflecting device 241.

For example, an oscillating drive 239 such as that described by way of example in conjunction with the preceding embodiments is provided for this purpose, wherein this drive moves the support 234, for example, so as to oscillate periodically in a direction 232 relative to the optical imaging means 240.

As a result of this displacement of the row 222 illustrated in bold type in FIG. 13 into the positions arranged in dash-dot lines in FIG. 13 it is possible to illuminate all the rows $230_1$ to $230_n$ of image elements 16 one after the other in a direction 242 with a periodically repetitive sequence.

The advantage of this solution is to be seen in the fact that with it a single oscillating drive 239 is sufficient to illuminate all the image elements 16 of the image surface section 14 and so the oscillating drive 239 which is particularly easy to operate is sufficient and the necessity of a statically operating drive in addition to an oscillating drive is dispensed with.

In this respect, the direction 232, in which the support 234 is movable, is preferably the vertical direction while the direction 226 is the horizontal direction.

The radiation outlets $224_1$ to $224_n$ may be radiation outlets for radiation guided to them by, for example, light guides. It is, however, also conceivable in the simplest case to arrange one row n of semiconductor radiation sources next to one another, the outlet openings of which form the radiation outlets $224_1$ to $224_n$ in order to move this row on the support 234 in a direction 232 in an oscillating manner.

If colored light is intended to be generated, it would be conceivable, for example, to mix the radiation with the different colors resulting in white light prior to the radiation outlets $224_1$ to $224_n$, as described in conjunction with the third embodiment in FIG. 6.

It is, however, also conceivable, as described within the scope of an eighth embodiment, illustrated in FIG. 16, to provide three rows $222_R$, $222_G$ and $222_B$ of semiconductor radiation sources, wherein the row $222_R$ has a plurality of radiation outlets $224_{1R}$ to $224_{nR}$ which represent, for example, all the outlet openings of semiconductor radiation sources for red light. In the same way, the row $222_G$ comprises a plurality of radiation outlets $224_{1G}$ to $224_{nG}$, from all of which green light, for example, from semiconductor radiation sources exits.

Finally, the row $222_B$ comprises a plurality of radiation outlets $224_{1B}$ to $224_{nB}$, from which blue light exits and which are likewise associated with individual semiconductor radiation sources for generating blue light.

All three rows $222_R$, $222_G$ and $222_B$ are seated on the common support 234 in the same way as in the seventh embodiment and are moved with this in the direction 232 preferably in an oscillating manner in order to illuminate all the image elements 16 of the image surface section 14, namely with the respective corresponding color or the color mixed accordingly, wherein the generation of a mixed color is possible due to radiation of the different colors red, green and blue not incident congruently with respect to time so that the individual row 222 of the rows $222_R$, $222_G$ and $222_B$ is always activated when the optical imaging means 240 is just imaging this row 230 of the plurality of rows $230_1$ to $230_n$.

For this purpose, a control 250 is preferably provided which controls a drive 239 for moving the rows $222_R$, $222_G$ and $222_B$.

Figure 17:
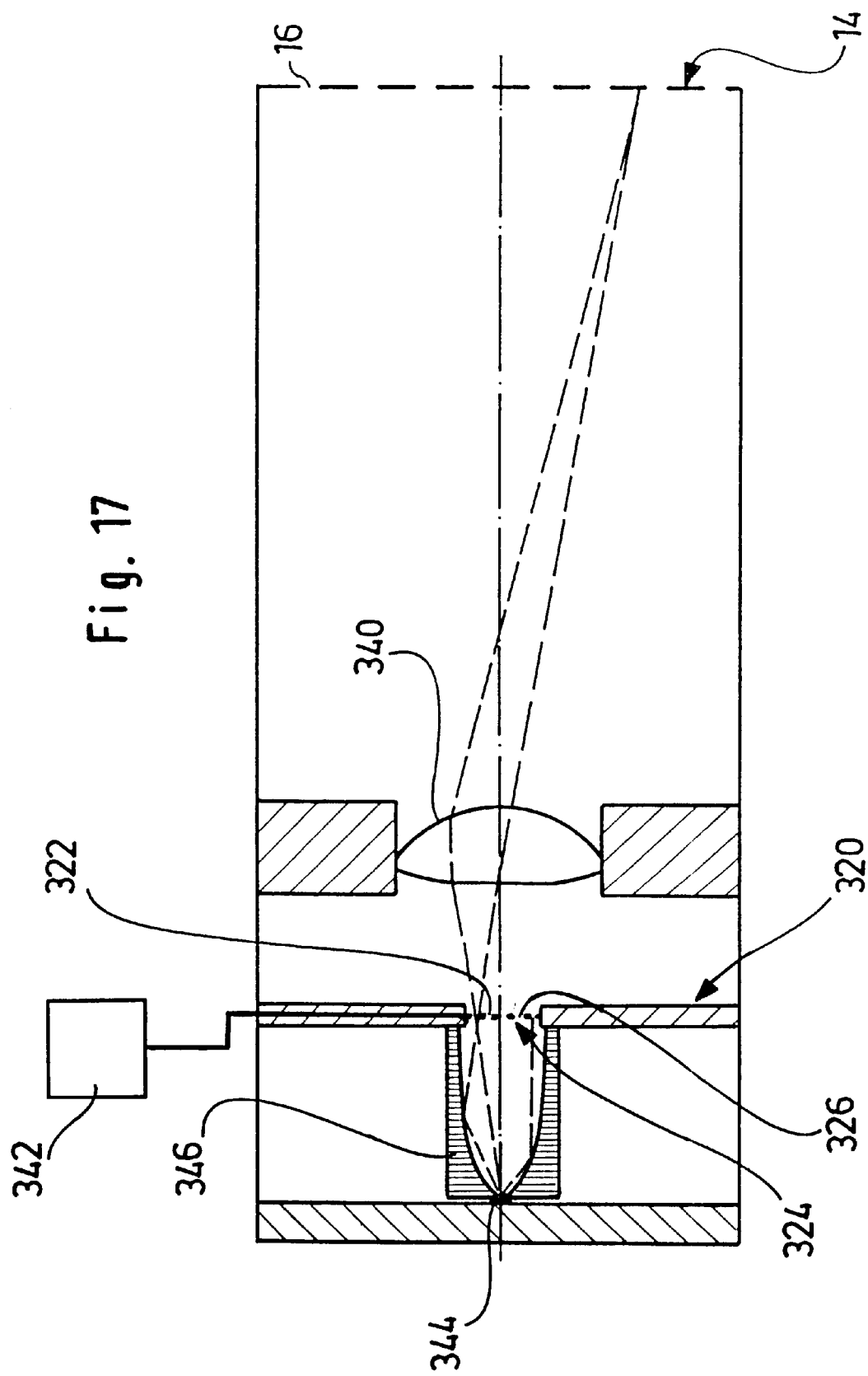
FIG. 17 shows a schematic illustration of an illumination unit of a ninth embodiment.

In a ninth embodiment of an inventive device, illustrated in FIG. 17, the illumination device 320 comprises a matrix 322 consisting of n×m modulation elements 324 which are in a position to modulate light in transmission with respect to the intensity. Each of these modulation elements 324 is, for example, an LCD element, with which a control of the intensity of transmitted light is possible.

Each of these modulation elements 324 has a light outlet opening 326 which forms the radiation outlet which is, for its part, imaged by the optical imaging means 340 onto the image surface section 14, wherein the image surface section 14 likewise has n×m image elements 16 and each of the image elements 16 is distinctly associated with a radiation outlet 326 by way of the optical imaging means 340.

Each of these modulation elements 324 can be controlled by a control 342, and modulates the intensity of the radiation coming, for example, from a semiconductor radiation source 344, wherein the radiation from the semiconductor radiation source 344 is preferably reflected by means of a reflector 346 to the matrix 322 of modulation elements 324 in order to have as much intensity as possible available at the radiation outlets 326.

Depending on the desired arrangement of illuminated image elements 16, it is possible in this respect to control the individual modulation elements 324 such that it is the image elements 16 clearly associated with these elements that are illuminated and the remaining image elements 16 are not illuminated.

If, in the case of the ninth embodiment illustrated in FIG. 17, a colored illumination of the image elements 16 is intended to be brought about, it is preferably provided for the semiconductor radiation source 344 to be replaced by three semiconductor radiation sources supplying the various colors red, green and blue, these sources illuminating the image elements 16 one after the other, wherein the mixture of color in the image elements 16 themselves is brought about on account of the mixing of three consecutive illuminations of the image elements 16 with the colors red, green and blue carried out by the eye, these illuminations resulting in the impression of the mixture of these three colors by the eye of the observer insofar as the illumination with the three colors red, green and blue takes place quickly enough one after the other.

Figure 18:
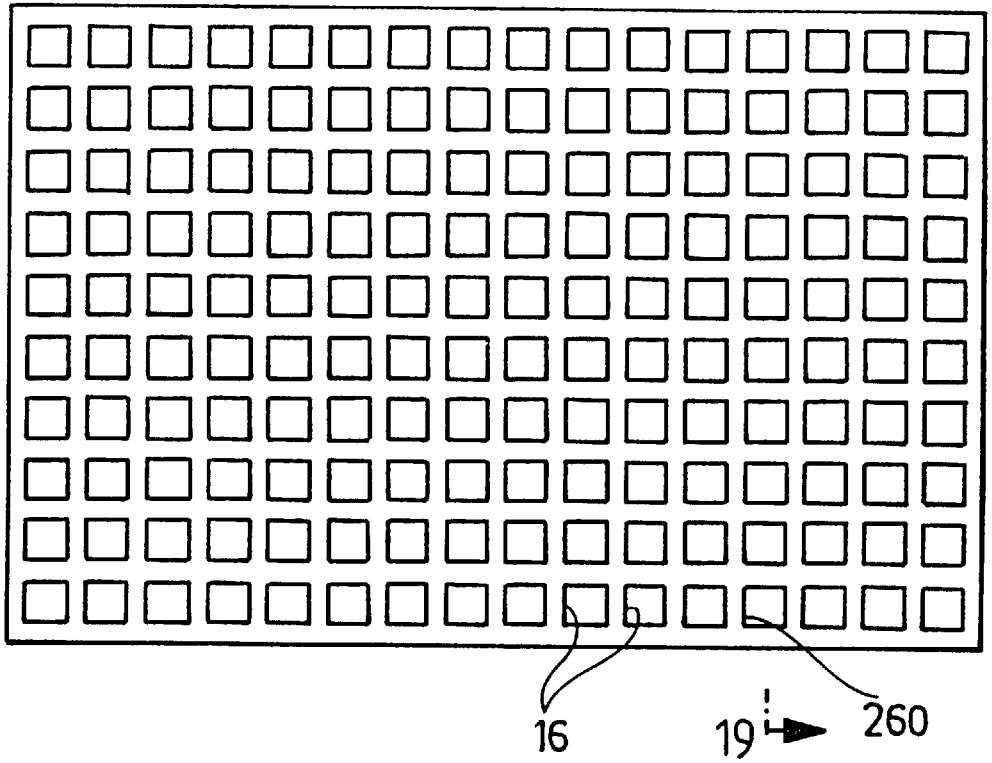
FIG. 18 shows a schematic illustration of one form of realizing an inventive image surface 12 and FIG. 19 shows a section along line 19—19 in FIG. 18.
Figure 19:
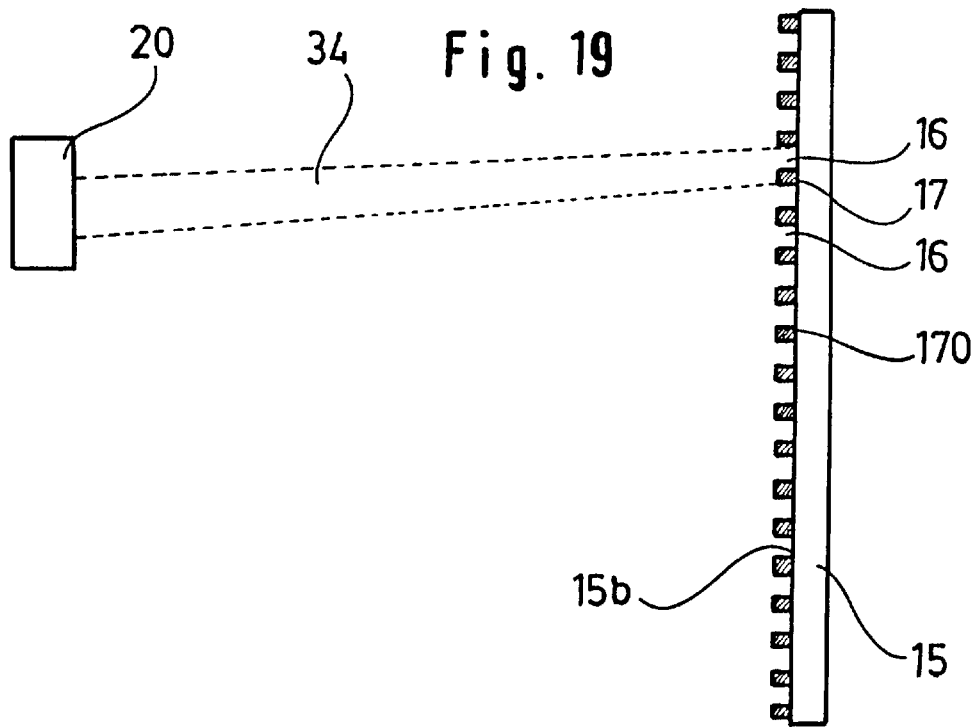

A preferred design of an image surface 12, as illustrated in FIGS. 18 and 19, provides for webs 17 to be arranged between the individual through openings provided for the image elements 16, these webs having a black upper surface 170 facing the observer and thus enhancing the contrast between the image elements 16.

These webs 17 are preferably behind a transparent plate 15 which defines the image surface 12 and is designed on its side 15b illuminated by the respective illumination unit 20 so as to scatter in a diffusing manner.

The webs 17 also have the advantageous property that positioning errors of the focused radiation field 34 coming from the respective illumination unit 20 are eliminated in that the focused radiation field 34 has a cross section which is greater than the cross section of the image element 16 so that even with slight positioning errors of the focused radiation field 34 the image element 16 is always illuminated but the remaining part of the radiation of this focused radiation field impinges on the webs 17.

As a result, the image element 16 always appears for the observer to be exactly at the same location irrespective of the positioning errors, to which the focused radiation field 34 is subject, for as long as the positioning errors are so slight that it is not the next image element 16 which is illuminated by the radiation field.

The webs 17 are preferably joined to form a mask 260 which supplies a background for the observer which enhances the contrast between the individual image elements 16.

What is claimed is:

1. A device for generating an image on an image surface with N×M individually illuminable image elements, comprising:

a plurality of illumination units, each illumination unit associated with one of a plurality of continuous image surface sections, said plurality of image surface sections forming said image and each image surface section comprising a two dimensional ensemble of image elements out of said N×M image elements, each illumination unit having at least one semiconductor radiation source and at least one optical imaging component of its own associated therewith, said optical imaging component imaging at least one radiation outlet onto each image element of said ensemble of image elements of the corresponding image surface section at separate times by beam deflection and subsequent free beam propagation, and each illumination unit having an associated beam deflecting device, each of said beam deflecting devices comprising at least one tilting micromechanical drive.

2. A device as defined in claim 1, wherein the illumination units are of an identical design.

3. A device as defined in claim 2, wherein the illumination units are identically constructed and identically controllable modules.

4. A device as defined in claim 1, wherein the illumination units are arranged in a surface extending approximately parallel to the image surface.

5. A device as defined in claim 1, wherein the illumination units are arranged on a support.

6. A device as defined in claim 5, wherein the illumination units are held by identical holding members in corresponding receiving elements on the support.

7. A device as defined in claim 1, wherein the image surface is constructed from groups of image surface sections of equal size.

8. A device as defined in claim 1, wherein the image surface has image surface sections of an identical size.

9. A device as defined in claim 1, wherein the image surface sections have maximum extensions in the same order of magnitude in the two transverse directions defining the image surface.

10. A device as defined in claim 9, wherein the maximum extensions are approximately of the same size.

11. A device as defined in claim 1, wherein all the image elements of one image surface section are located immediately next to one another.

12. A device as defined in claim 1, wherein the beam deflecting device is adapted to generate a relative movement of the radiation field exiting from each illumination unit, in at least one direction in relation to the image elements of the image surface section.

13. A device as defined in claim 1, wherein the beam deflecting device is adapted to move at least one optical component of the illumination unit relative to the image surface section.

14. A device as defined in claim 13, wherein the beam deflecting device is adapted to move a radiation outlet of the radiation field from the semiconductor radiation source relative to the image surface section.

15. A device as defined in claim 13, wherein at least one component of the optical imaging apparatus is movable.

16. A device as defined in claim 1, wherein the tilting drive has two support elements tiltable relative to one another about an axis of tilt.

17. A device as defined in claim 16, wherein the support elements are connected by means of an elastically deformable material web.

18. A device as defined in claim 16, wherein the support elements are movable relative to one another by means of an electric field.

19. A device as defined in claim 1, wherein the drive is a static adjustable drive.

20. A device as defined in claim 1, wherein one drive is an oscillating drive.

21. A device as defined in claim 20, wherein the oscillating drive operates close to its resonant frequency.

22. A device as defined in claim 1, wherein each illumination unit has a row of radiation outlast imaged by the optical imaging means at the same time onto a row of imaging elements of the image surface section.

23. A device as defined in claim 22, wherein:
the number of radiation outlets of the row corresponds to the number of image elements of the row of image elements in a direction of the corresponding image surface section parallel to the row, and
the illumination of the image surface sections is brought about by a beam deflecting device in a direction transverse to the row.

24. A device as defined in claim 22, wherein the extension of the row of radiation outlets in the longitudinal direction is smaller than the extension of the corresponding row of image elements in this direction.

25. A device as defined in claim 22, wherein each illumination unit has three rows of radiation outlast.

26. A device as defined in claim 25, wherein each of the rows of radiation outlets exits radiation of one of three colors that may be superimposed to form white light.

27. A device as defined in claim 25, wherein each of the various rows of radiation outlets is actuable separately with respect to time via a control.

28. A device as defined in claim 1, wherein at least one semiconductor radiation source is associated with each radiation outlet.

29. A device as defined in claim 1, wherein the illumination unit has at least one row of modulation elements modulating radiation in transmission, the respective light outlet areas of said elements forming the radiation outlets imaged onto the image surface section together by the optical imaging means.

30. A device as defined in claim 29, wherein the illumination unit has a two-dimensional matrix of modulation elements forming a two dimensional matrix of radiation outlets.

31. A device as defined in claim 30, wherein the number of modulation elements of the matrix corresponds to the number of image elements in the corresponding image surface section.

32. A device as defined in claim 29, wherein the modulation elements have light entry areas illuminated by the at least one semiconductor radiation source.

33. A device as defined in claim 32, wherein the at least one semiconductor radiation source illuminates the light entry areas of all the modulation elements of one illumination unit.

34. A device as defined in claim 1, wherein each illumination unit comprises at least three semiconductor radiation sources generating radiation in three different colors which may be superimposed to form white light.

35. A device for generating an image on an image surface with N×M individually illuminable image elements, comprising:
a plurality of illumination units, each illumination unit associated with one of a plurality of continuous image surface sections, said plurality of image surface sections forming said image and each image surface section comprising a two dimensional ensemble of image elements out of said N×M image elements,
each illumination unit having at least one semiconductor radiation source and at least one optical imaging component of its own associated therewith, said optical imaging component imaging at least one radiation outlet onto each image element of said ensemble of image elements of the corresponding image surface section at separate times by beam deflection and subsequent free beam propagation,
each illumination unit having an associated beam deflecting device, each of said beam deflecting devices comprising two micromechanical drives operative in directions extending transversely to one another.

36. A device as defined in claim 35, wherein
each illumination unit comprises at least three semiconductor radiation sources generating radiation in three different colors which may be superimposed to form white light.

37. A device as defined in claim 36, wherein the illumination unit has three semiconductor radiation sources for the illumination of each radiation outlet, said sources generating radiation in three colors which may be superimposed to form white light.

38. A device as defined in claim 36, wherein the radiation with the colors of the semiconductor radiation sources which may be superimposed to form white light is coupled into a light guide adapted to guide the radiation comprising the three colors to a radiation outlet.

39. A device as defined in claim 36, wherein three radiation outlets are associated with each image element.

40. A device as defined in claim 37, wherein the three semiconductor radiation sources are actuable at different points of time.

41. A device as defined in claim 36, wherein the semiconductor radiation source is a semiconductor diode.

42. A device as defined in claim 41, wherein the semiconductor diode is a resonant LED.

43. A device a defined in claim 41, wherein the semiconductor radiation source is a laser radiation source.

44. A device as defined in claim 36, wherein each said optical imaging component successively images said at least one radiation outlet onto said image elements of said ensemble of image elements of the corresponding image surface section.

45. A device as defined in claim 36, wherein each said optical imaging component images said at least one radiation outlet onto said image elements of said ensemble of image elements of the corresponding image surface section in accordance with an illumination sequence.

46. A device for generating an image on an image surface with N×M individually illuminable image elements, comprising:

a plurality of illumination units, each illumination unit associated with one of a plurality of continuous image surface sections, said plurality of image surface sections forming said image and each image surface section comprising a two dimensional ensemble of image elements out of said N×M image elements, each illumination unit having at least one semiconductor radiation source and at least one optical imaging component of its own associated therewith, said optical imaging component imaging at least one radiation outlet onto each image element of said ensemble of image elements of the corresponding image surface section at separate times by beam deflection and subsequent free beam propagation, each illumination unit having an associated beam deflecting device, each of said beam deflecting devices comprising at least one micromechanical displacement drive having a deflectable guide arm supporting on one end the optical component of the illumination unit to be displaced, the other end of said guide arm being secured.

47. A device as defined in claim 46, wherein the guide arm is deflectable by means of an electric field.

48. A device as defined in claim 46, wherein the guide arm is designed as a spring-elastic element.

49. A device as defined in claim 46, wherein each illumination unit comprises at least three semiconductor radiation sources generating radiation in three different colors which may be superimposed to form white light.

* * * * *

UNITED STATES PATENT AND TRADEMARK OFFICE
CERTIFICATE OF CORRECTION

PATENT NO. : 6,741,225 B1
DATED : May 25, 2004
INVENTOR(S) : Brauch et al.

It is certified that error appears in the above-identified patent and that said Letters Patent is hereby corrected as shown below:

Column 19,
Line 57, after the word "radiation", correct the word "outlast" to read -- outlets --.

Column 20,
Line 6, after the word "radiation", correct the word "outlast" to read -- outlets --.

Signed and Sealed this

Twentieth Day of September, 2005

JON W. DUDAS
*Director of the United States Patent and Trademark Office*